US012783946B2

United States Patent
Liu et al.

(10) Patent No.: US 12,783,946 B2
(45) Date of Patent: Nov. 3, 2026

(54) DECOUPLED OPTIMIZATION OF MODELS DURING PRETRAINING

(71) Applicant: Microsoft Technology Licensing, LLC, Redmond, WA (US)

(72) Inventors: Xiaodong Liu, Woodinville, WA (US); Chengyu Dong, San Diego, CA (US); Lucas Liu, Redmond, WA (US); Hao Cheng, Kinkland, WA (US); Jianfeng Gao, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 669 days.

(21) Appl. No.: 18/212,491

(22) Filed: Jun. 21, 2023

(65) Prior Publication Data

US 2024/0281705 A1 Aug. 22, 2024

Related U.S. Application Data

(60) Provisional application No. 63/446,555, filed on Feb. 17, 2023.

(51) Int. Cl.
*H04L 29/06* (2006.01)
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2021/0019564 A1* 1/2021 Zhou ........................ G06F 18/24
2024/0169249 A1* 5/2024 Kim ........................ G06Q 50/20

OTHER PUBLICATIONS

Arora, "A Convergence Analysis of Gradient Descent for Deep Linear Neural Networks", In repository of arxiv code: 1810.02281v1 [cs.LG], Oct. 4, 2018, 31 Pages.
Bajaj, et al., "Metro: Efficient denoising pretraining of large scale autoencoding language models with model generated signals", In Repository of arXiv:2204.06644v2, Apr. 16, 2022, 28 Pages.
Bao, et al., "UniLMv2: Pseudo-Masked Language Models for Unified Language Model Pre-Training", In repository of arxiv code: 2002.12804v1 [cs.CL], Feb. 28, 2020, 11 Pages.
Chi, et al., "XLM-E: Cross-lingual Language Model Pre-training via electra", In Proceedings of Annual Meeting of the Association for Computational Linguistics, Jun. 30, 2021, 12 Pages.
(Continued)

*Primary Examiner* — Evans Desrosiers
(74) *Attorney, Agent, or Firm* — Rainier Patents, P.S.

(57) ABSTRACT

The disclosed concepts relate to pretraining of machine learning models. One example method involves performing separate optimization of a first machine learning model and a second machine learning model. The first machine learning model can be optimized based at least on first predictions and the second machine learning model can be optimized based at least on second predictions. The first predictions can represent predictions of masked values in first sequences of values values, and the second predictions can represent whether or not the first values were replaced with different values predicted by the first machine learning model.

20 Claims, 14 Drawing Sheets

(56) References Cited

OTHER PUBLICATIONS

Clark, et al., "ELECTRA: Pre-training Text Encoders as Discriminators Rather Than Generators", In Repository of arXiv:2003.10555v1, Mar. 23, 2020, 18 Pages.
Devlin, et al., "Bert: Pre-Training of Deep Bidirectional Transformers for Language Understanding", In Repository of arXiv:1810.04805, May 24, 2019, 16 Pages.
Hao, et al., "Learning to Sample Replacements for ELECTRA Pre-Training", In Proceedings of Findings of the Association for Computational Linguistics, Aug. 1, 2021, pp. 4495-4506.
He, et al., "DeBerta: Decoding-enhanced Bert with Disentangled Attention", In repository of arxiv code: 2006.03654v1 [cs.CL], Jun. 5, 2020, 17 Pages.
He, et al., "DeBertaV3: Improving DeBerta using Electra-Style Pre-Training with Gradient-Disentangled Embedding Sharing", In Repository of arXiv:2111.09543v2, Dec. 8, 2021, 16 Pages.
Kanakarajan, et al., "Small-Bench NLP: Benchmark for Small Single GPU Trained Models in Natural Language Processing", In Repository of arXiv:2109.10847v2, Sep. 23, 2021, 5 Pages.
Ke, et al., "Rethinking Positional Encoding in Language Pre-training", In Proceedings of 9th International Conference on Learning Representations, May 3, 2021, 14 Pages.
Kingma, et al., "Adam: A Method for Stochastic Optimization", In Proceedings of 3rd International Conference for Learning Representations, Jul. 23, 2015, 15 Pages.
Liu, et al., "Multi-head or Single-head? An Empirical Comparison for Transformer Training", In repository of arxiv code: 2106.09650v1 [cs.CL], Jun. 17, 2021, 11 Pages.
Liu, et al., "Multi-Task Deep Neural Networks for Natural Language Understanding", In Proceedings of the 57th Annual Meeting of the Association for Computational Linguistics, Association for Computational Linguistics, Jul. 28, 2019, pp. 4487-4496.
Liu, et al., "Roberta: A Robustly Optimized Bert Pretraining Approach", In Repository of arXiv:1907.11692v1, Jul. 26, 2019, 13 Pages.
Liu, et al., "The Microsoft Toolkit of Multi-Task Deep Neural Networks for Natural Language Understanding", In Proceedings of the 58th Annual Meeting of the Association for Computational Linguistics: System Demonstrations, Feb. 19, 2020, pp. 118-126.
Liu, et al., "Understanding the difficulty of training transformers", In repository of arxiv code: 2004.08249v2 [cs.LG], Sep. 18, 2020, 18 Pages.
Meng, et al., "COCO-LM: Correcting and Contrasting Text Sequences for Language Model Pretraining", In Repository of arXiv:2102.08473v1, Feb. 16, 2021, 13 Pages.
Meng, et al., "Pretraining Text Encoders with Adversarial Mixture of Training Signal Generators", In repository of arxiv code: 2204.03243v1 [cs.CL], Apr. 7, 2022, 18 Pages.
Ott, et al., "fairseq: A Fast, Extensible Toolkit for Sequence Modeling", In Proceedings of NAACL-HLT (Demonstrations), Jun. 2, 2019, pp. 48-53.
Raffel, et al., "Exploring the Limits of Transfer Learning with a Unified Text-to-Text Transformer", In repository of arxiv code: 1910.10683v3 [cs.LG], Oct. 23, 2019, 52 Pages.
Wang, et al., "GLUE: A Multi-Task Benchmark and Analysis Platform for Natural Language Understanding", In Proceedings of the EMNLP Workshop BlackboxNLP: Analyzing and Interpreting Neural Networks for NLP, Nov. 1, 2018, pp. 353-355.
Wei, et al., "Aligning Pretraining for Detection via Object-Level Contrastive Learning", In Proceedings of 35th Conference on Neural Information Processing Systems, Jun. 4, 2021, 13 Pages.
Williams, "A Broadcoverage Challenge Corpus for Sentence Understanding through Inference", In the 15th Annual Conference of the North American Chapter of the Association for Computational Linguistics: Human Language Technologies, Apr. 18, 2017, 11 Pages.
Xu, et al., "MC-BERT: Efficient Language Pre-Training via a Meta Controller", In repository of arxiv code: 2006.05744v2 [cs.CL], Jun. 16, 2020, 14 Pages.
Yang, et al., "XLNet: Generalized Autoregressive Pretraining for Language Understanding", In Proceedings of Advances in Neural Information Processing Systems, Dec. 8, 2019, 11 Pages.
Zhang, et al., "Language Model Pre-Training on True Negatives", In Repository of arXiv:2212.00460v1, Dec. 1, 2022, 12 Pages.
Zhu, et al., "Aligning books and movies: Towards story-like visual explanations by watching movies and reading books", In Proceedings of the IEEE international conference on computer vision, Dec. 7, 2015, pp. 19-27.
Zoph, et al., "Rethinking Pre-training and Self-training", In repository of arxiv code: 2006.06882v2, Nov. 15, 2020, 20 Pages.
International Preliminary Report on Patentability received for PCT Application No. PCT/US2024/016058, mailed on Aug. 28, 2025, 09 pages.
Clark, et al., "ELECTRA: Pre-training Text Encoders as Discriminators Rather Than Generators," arXiv preprint, Mar. 23, 2020, 18 Pages.
International Search Report and Written Opinion received for PCT Application No. PCT/US2024/016058, Jun. 13, 2024, 14 pages.
Shen, et al.,"Training ELECTRA Augmented with Multi-word Selection," arXiv preprint, Mar. 3, 2022, 12 Pages.
Xu, et al., "SAS: Self-Augmentation Strategy for Language Model Pre-training," Proceedings of the AAAI Conference on Artificial Intelligence, Jan. 11, 2023, pp. 11586-11594.
Dong, et al., "Understand and modularize generator optimization in electra-style pretraining," International Conference on Machine Learning, PLMR, Jul. 2023, pp. 8244-8259, 16 pages.

* cited by examiner

COUPLED PRETRAINING GENERATOR ACCURACY CHART 1200

DECOUPLED PRETRAINING GENERATOR ACCURACY CHART 1300

DECOUPLED OPTIMIZATION OF MODELS DURING PRETRAINING

BACKGROUND

Machine learning can be used to perform a broad range of tasks, such as natural language processing, financial analysis, and image processing. Machine learning models can be trained using several approaches, such as supervised learning, semi-supervised learning, unsupervised learning, reinforcement learning, etc. In approaches such as supervised learning, labeled training examples can be used to train a model to map inputs to outputs. In unsupervised learning, models can learn from patterns present in an unlabeled dataset.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for pre-training of machine learning models. One example includes a method or technique that can be performed on a computing device. The method or technique can include obtaining first sequences of first values and masking one or more of the first values in the first sequences to obtain masked first sequences having one or more of the first values and one or more masked values. The method or technique can also include, using a first machine learning model, determining first predictions of the one or more masked values in the masked first sequences. The method or technique can also include replacing the one or more masked values with the first predictions to obtain second sequences of second values. The method or technique can also include, using a second machine learning model, determining second predictions of whether the second values were present in the first sequences or replaced by different values predicted by the first machine learning model. The method or technique can also include performing separate optimization of the first machine learning model and the second machine learning model, the first machine learning model being optimized based at least on the first predictions and the second machine learning model being optimized based at least on the second predictions.

Another example includes a system having a hardware processing unit and a storage resource storing computer-readable instructions. When executed by the hardware processing unit, the computer-readable instructions can cause the system to obtain a pretrained machine learning model having been pretrained to predict whether second values in second sequences were present in first sequences of first values or replaced by different values predicted by another machine learning model, the pretrained machine learning model and the another machine learning model having been separately optimized. The computer-readable instructions can also cause the system to tune the pretrained machine learning model for a particular task using task-specific training data to obtain a tuned machine learning model.

Another example includes a computer-readable storage medium storing computer-readable instructions. When executed by a processing unit, the computer-readable instructions can cause the processing unit to perform acts. The acts can include obtaining first sequences of first values and masking one or more of the first values in the first sequences to obtain masked first sequences having one or more of the first values and one or more masked values. The acts can also include, using a first machine learning model, determining first predictions of the one or more masked values in the masked first sequences. The acts can also include replacing the one or more masked values with the first predictions to obtain second sequences of second values. The acts can also include, using a second machine learning model, determining second predictions of whether the second values were present in the first sequences or replaced by different values predicted by the first machine learning model. The acts can also include performing separate optimization of the first machine learning model and the second machine learning model, the first machine learning model being optimized based at least on the first predictions and the second machine learning model being optimized based at least on the second predictions.

The above listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

DETAILED DESCRIPTION

Machine Learning Overview

Figure 1:
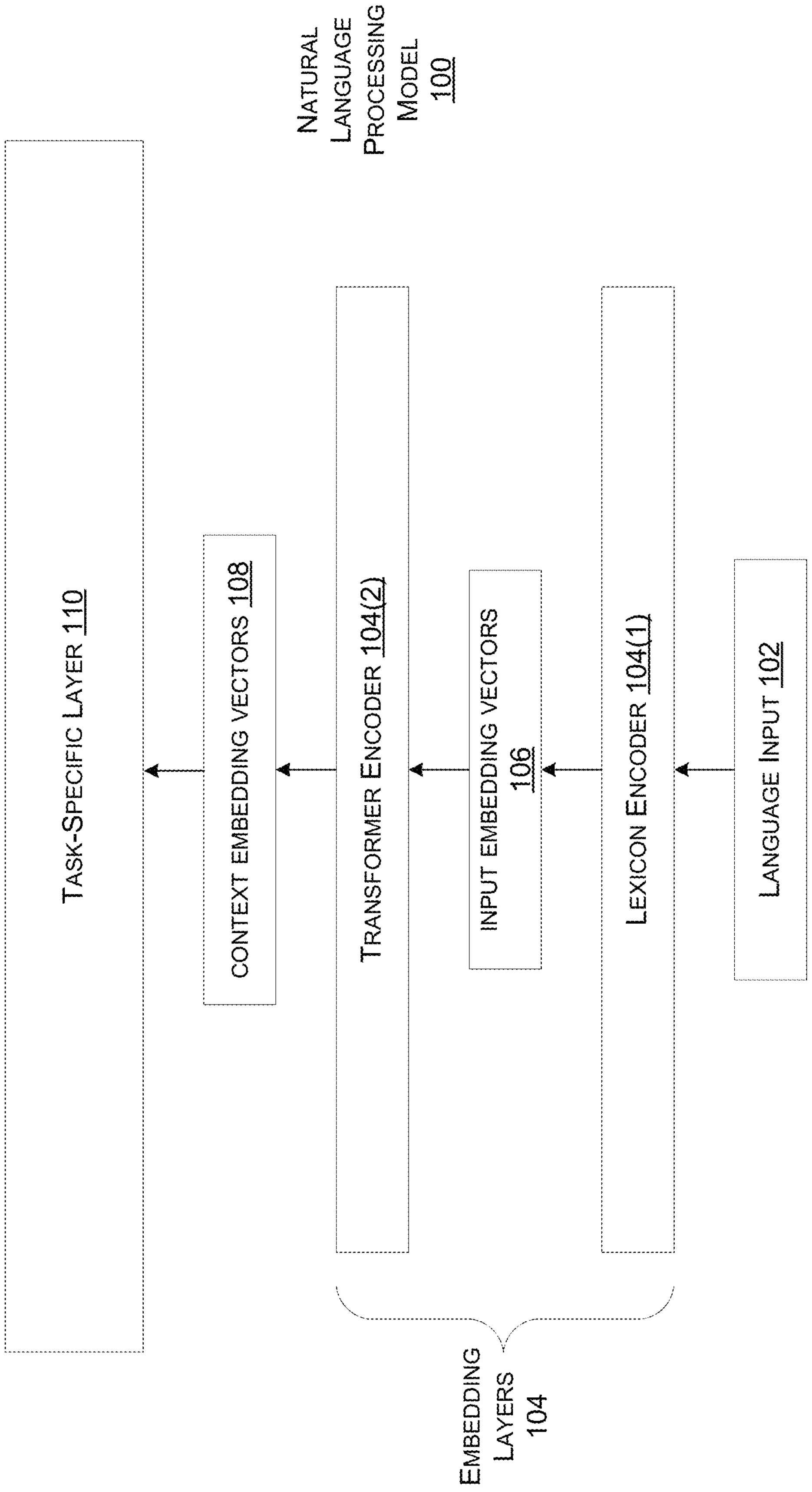
FIG. 1 illustrates an example of a natural language processing model that can be employed as a main or auxiliary model, consistent with some implementations of the present concepts.

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" when used without a modifier is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models are trained on different training data or if there are underlying stochastic processes in the training process.

There are many machine learning tasks for which there is a relative lack of training data. One broad approach to training a model with limited task-specific training data for a particular task involves "transfer learning." In transfer learning, a model is first pretrained on another task for which significant training data is available, and then the model is tuned to the particular task using the task-specific training data.

The term "pretraining," as used herein, refers to model training on a set of pretraining data to adjust model parameters in a manner that allows for subsequent tuning of those model parameters to adapt the model for one or more specific tasks. In some cases, the pretraining can involve a self-supervised learning process on unlabeled pretraining data, where a "self-supervised" learning process involves learning from the structure of pretraining examples, potentially in the absence of explicit (e.g., manually-provided) labels. Subsequent modification of model parameters obtained by pretraining is referred to herein as "tuning." Tuning can be performed for one or more tasks using supervised learning from explicitly-labeled training data, in some cases using a different task for tuning than for pretraining.

One broad approach for pretraining of a model involves the use of an auxiliary model that is pretrained together with a main model. For instance, in natural language contexts, the auxiliary model (a text generator) can be trained to determine predicted values of masked tokens from a first sequence of tokens. Then, the predicted values can be used to replace the masked tokens to obtain a second sequence of tokens. The main model (a discriminator) can be trained to predict whether the tokens in the second sequence were present in the first sequence or replaced by different values predicted by the auxiliary model. Then, the pretrained main model can be adapted for various natural language processing tasks, such as sentiment detection, sentence classification, etc. However, conventional approaches tend to jointly optimize the auxiliary and main models (including shared parameters) during pretraining. This can degrade the performance of the main model, particularly when the auxiliary model is large.

The disclosed implementations offer several mechanisms to address these issues. First, the disclosed implementations can perform separate optimization of the auxiliary and main models. Second, in some implementations, parameters are not shared between the auxiliary and main models. As a consequence, the optimization of the main model can be performed independently, and the resulting pretrained main model will tend to learn pretrained parameters that allow for very accurate performance when the pretrained main model is subsequently tuned to a particular task.

While the following examples are taken from natural language processing, the disclosed techniques can be employed to train (e.g., pretrain, tune, etc.) models for a wide variety of problem domains. For instance, image processing, computer vision, radar, sonar, or other sensing tasks can be accomplished using machine learning models that are optimized as described herein. In addition, the disclosed implementations can be employed in medical scenarios (e.g., regression learning for predicting drug efficacy), analysis of genetic markers, protein analysis, etc.

Example Natural Language Processing Model

FIG. 1 illustrates an exemplary natural language processing model 100 that can be trained using the disclosed implementations. Natural language processing model 100 is an example of a machine learning model that can be used to perform one or more natural language processing tasks, as discussed more below. For the purposes of this document, the term "natural language" means language that is normally used by human beings for writing or conversation.

Natural language processing model 100 can receive language input 102, which can include words, tokens, sentences, phrases, or other representations of language. The language inputs can be processed by embedding layers 104, which include a lexicon encoder 104(1) and a transformer encoder 104(2). Generally, both the lexicon and transformer encoders operate to produce vectors that represent individual words, tokens, sentences, or phrases in a vector space where semantically-similar and/or syntactically-similar words, tokens, sentences, or phrases are relatively close to one another, and less semantically-similar or syntactically-similar words, sentences, tokens, or phrases are relatively further apart. These vectors are also referred to herein as "embeddings."

Lexicon encoder 104(1) can produce a sequence of input embedding vectors 106 for each word or token in the language input 102. An input to the lexicon encoder can be sequence of tokens of length m, $X=\{x_1, \ldots, x_m\}$. Specific tokens can be used to delineate the beginning of each sequence, and to separate individual sentences in a given sequence. The lexicon encoder can map X into a sequence of input embedding vectors, one for each token. In some implementations, the input embedding vectors are constructed by summing corresponding word, segment, and positional embeddings for each word.

Transformer encoder 104(2) can obtain contextual information for each word, e.g., via self-attention, and generate a sequence of context embedding vectors 108. Self-attention is a mechanism relating different positions of tokens within a sentence to compute the similarities between those tokens. In some implementations, the transformer encoder is a multilayer bidirectional transformer encoder that is configured to map the input embedding vectors 106 into the context embedding vectors. As discussed more below, the context embedding vectors can be used as a shared representation of the input phrases or sentences across different tasks. The context embedding vectors represent the words or tokens as well as the context within which each word or token appears in an underlying document, query, or other input. Note that both the lexicon encoder 104(1) and the transformer encoder 104(2) can be initialized using unsupervised techniques, and then subsequently updated by tuning using labeled training data for a specific task.

The context embedding vectors 108 can be input to task-specific layer 110 to perform task-specific processing, as discussed more below. Task-specific layer 110 can evaluate the context embedding vectors 108 to produce a task-specific output. Note that the following examples of task-specific layer 110 are but a few examples of types of task-specific layers that can be employed.

In some implementations, the task-specific layer can be a single-sentence classification layer that can label a sentence using class labels. As one specific example, a single-sentence classification layer can predict whether an English sentence is grammatically plausible. Another example classification task is to determine whether the sentiment of a sentence extracted from movie reviews is positive or negative. As discussed more below, the output of a task-specific layer for a classification task can include a corresponding probability for each potential classification.

In other implementations, the task-specific layer 110 can be a pairwise text similarity layer that performs a regression task on a pair of input sentences. The regression task can involve outputting a real-valued similarity score indicating the semantic similarity of the two sentences.

In other implementations, the task-specific layer 110 can be a pairwise text classification layer that predicts a relationship (e.g., entailment) between a pair of input sentences, where the relationship is selected from a set of pre-defined labels. For example, the labels can indicate whether one input sentence has an entailment relationship, a contradiction relationship, or a neutral relationship with respect to the other input sentence.

In other implementations, the task-specific layer 110 can be a relevance ranking layer that outputs a relevance score that conveys the relevance of two input items, e.g., the relevance of a document to a query. The relevance scores can be used in a subsequent natural language processing operation to rank the candidate answers in the order of relevance to the query.

Replaced Token Detection

Figure 2:
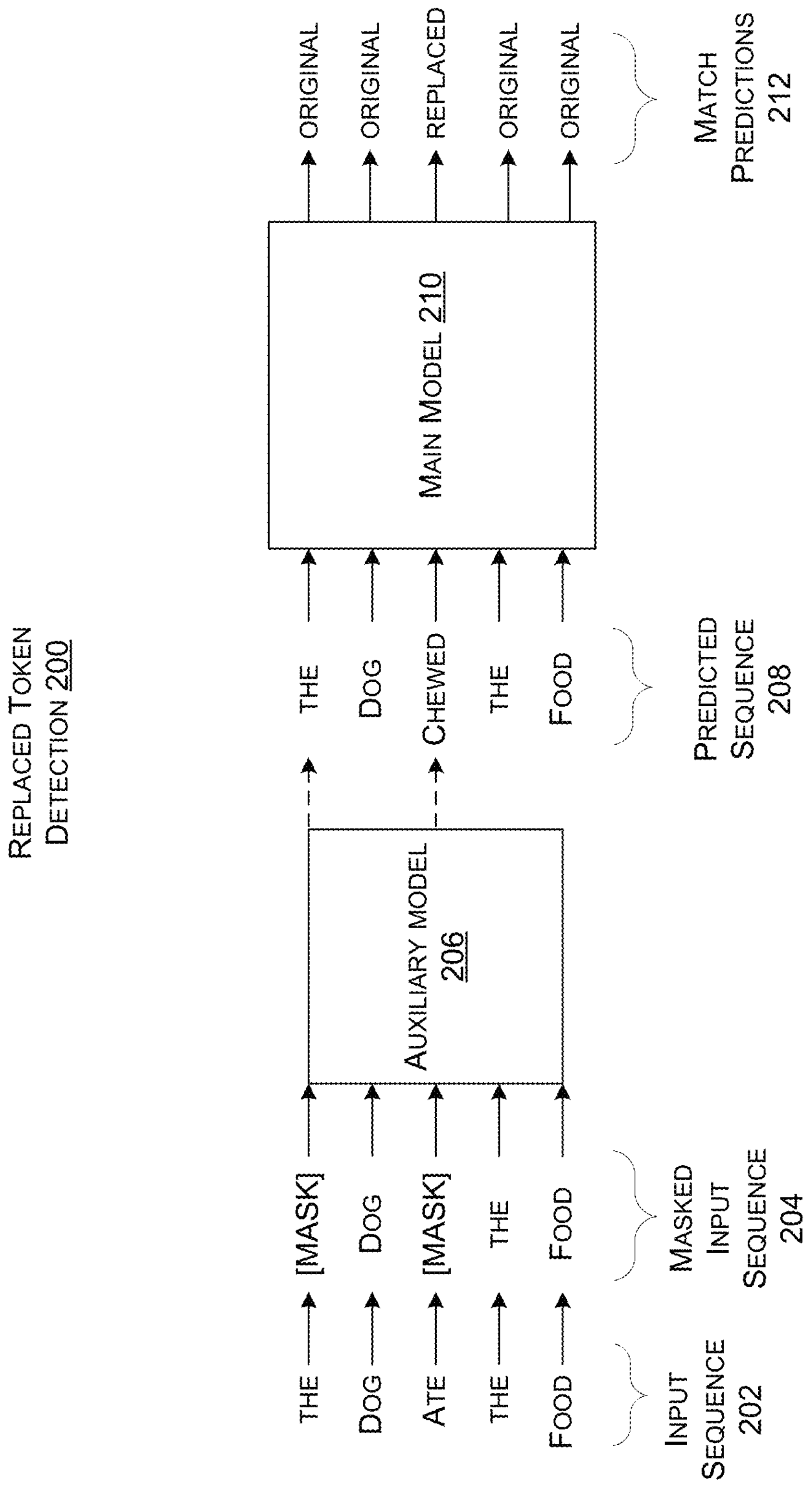
FIG. 2 illustrates an example of replaced token detection, consistent with some implementations of the present concepts.

FIG. 2 shows an example of replaced token detection 200, which can be used for pretraining. An input sequence 202 is selectively (e.g., randomly) masked to obtain a masked input sequence 204. An auxiliary model 206 predicts values of the masked tokens, "the" and "ate." A predicted sequence 208 includes the unmasked tokens of the input sequence with predicted values of the masked tokens, "the" and "chewed," respectively. The main model 210 outputs match predictions 212 of whether each token in the predicted sequence was present in the original input sequence or was replaced by a different value predicted by the auxiliary model. Here, the match predictions are correct, e.g., the main model correctly predicts that "the" as predicted by the auxiliary model was present in the original input sequence and that "chewed" as predicted by the auxiliary model replaced the actual value "ate" from the input sequence. However, in other cases, the match predictions may be incorrect, and parameters of the main model can be adjusted based on errors in the match predictions. Likewise, parameters of the auxiliary model can be adjusted based on errors in the predicted sequence. In some implementations, both the auxiliary model and the main model adopt the encoder architecture shown in FIG. 1, having respective task-specific layers. A task-specific layer of the auxiliary model can be trained to output the predicted values of the masked tokens and a task-specific layer of the main model can be trained to predict whether the tokens in the predicted sequence were present in the original input sequence or replaced by tokens predicted by the auxiliary model.

Example Training Workflow

Figure 3:
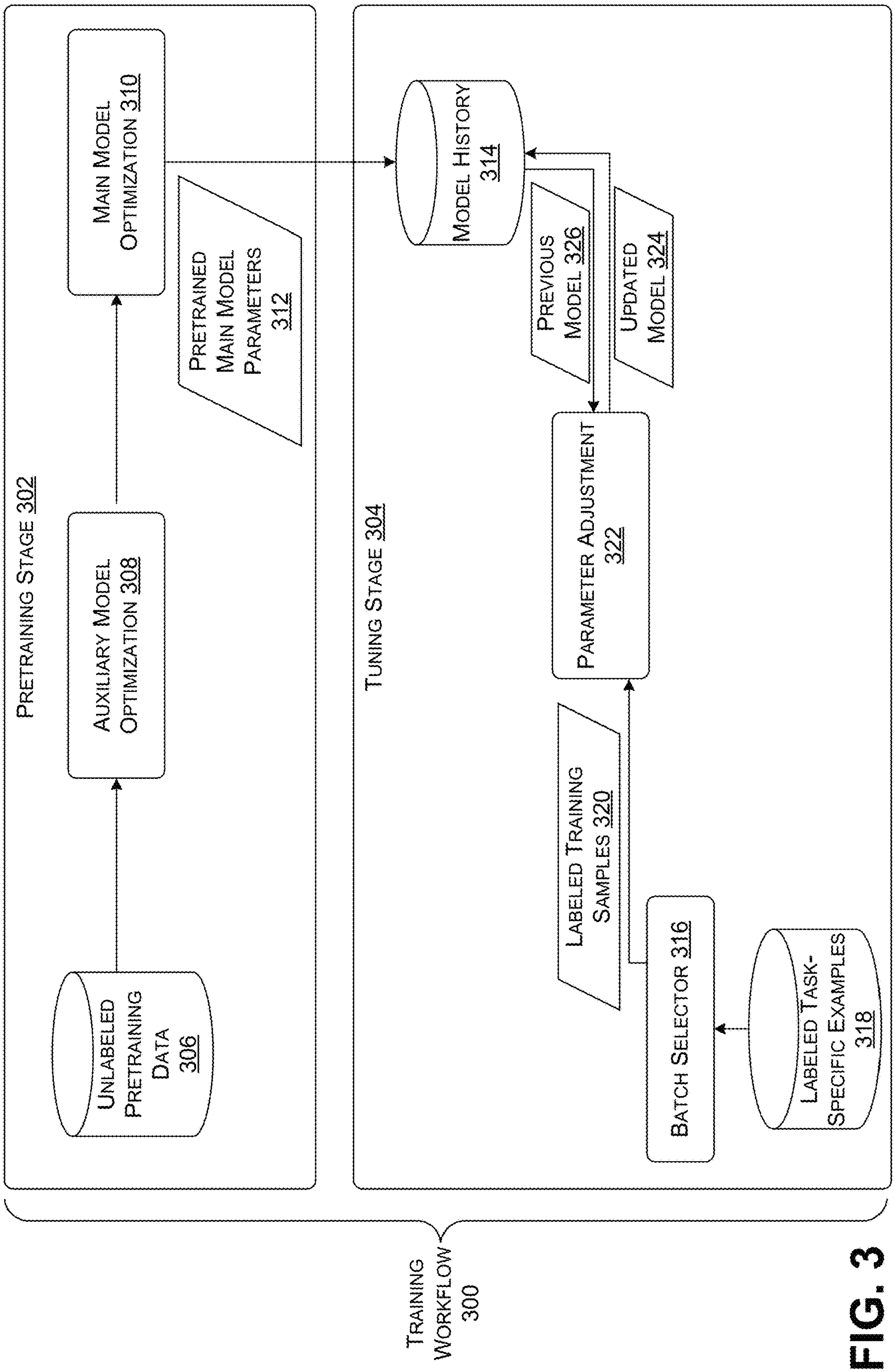
FIG. 3 illustrates an example training workflow, consistent with some implementations of the present concepts.

FIG. 3 illustrates an example training workflow 300 for training of a machine learning model, consistent with some implementations. The training workflow is described using the natural language processing model 100 shown in FIG. 1 as an example model, but the training workflow can be performed on many different types of machine learning models.

Training workflow 300 can include a pretraining stage 302 and a tuning stage 304. As discussed more below, the pretraining stage can employ replaced token detection to determine pretrained parameters for one or more layers of a machine learning model, and the tuning stage can be used to adapt those pretrained parameters to a particular task. As also described more below, in some cases the tuning stage is applied to one or more additional layers that are not initialized during the pretraining stage.

In some implementations, the pretraining stage 302 can utilize unlabeled pretraining data 306 to perform auxiliary model optimization 308. As noted above, this can involve masked token prediction by the auxiliary model using unsupervised learning from the unlabeled pretraining data. For instance, the unlabeled pretraining data can provide an unlabeled corpus of documents in a given natural language. The auxiliary model optimization can involve masking tokens and training embedding layers of the auxiliary model to predict the masked tokens. Additional details can be found in Jacob Devlin, Ming-Wei Chang, Kenton Lee, and Kristina Toutanova, "*Bert: Pre-training of deep bidirectional transformers for language understanding,*" 2018, arXiv preprint arXiv:1810.04805. Auxiliary model optimization can involve adaptive optimization, e.g., using a first instance of an Adam optimizer that can adapt the learning rate of parameters of the auxiliary model as pretraining proceeds.

The pretraining stage can also involve main model optimization 310. As noted previously, main model optimization can involve replaced token detection, e.g., predicting whether tokens in the predicted sequence were present in the original input sequence or replaced by tokens predicted by the auxiliary model. Main model optimization can also involve adaptive optimization, e.g., using a second instance of an Adam optimizer that can adapt the learning rate of parameters of the main model as pretraining proceeds. Note that the learning rates employed for auxiliary and main model optimization can be different because the models are optimized separately during pretraining. Note that auxiliary and main model optimization are not necessarily performed in a serial fashion, but can be performed together as described more below.

Main model optimization 310 results in pretrained main model parameters 312, which can be output to model history 314. As described more below, tuning stage 304 can involve adjusting the pretrained model parameters along with initialized (e.g., random) parameters of a task-specific layer. Collectively, the pretrained parameters of the embedding layers and the initialized parameters of the task-specific layer form a first iteration of a task-specific machine learning model. As discussed more below, subsequent tuning iterations can be used to revise these initial parameters to obtain subsequent iterations of the task-specific machine learning model.

One specific tuning approach is to use a stochastic gradient descent technique to tune the pretrained parameters with the parameters of the task-specific layer. In each training iteration or epoch, batch selector 316 selects a batch of labeled task-specific data from labeled task-specific examples 318, and outputs the selected batch as labeled training samples 320.

The labeled training samples 320 are input to parameter adjustment process 322, where the model parameters are tuned to obtain an updated model 324 which is then output to the model history 314. The next tuning iteration can proceed by retrieving the previous model 326 from the model history 314 and continuing with tuning iterations until a stopping condition is reached, e.g., the model converges, achieves a threshold accuracy on a test data set, a training budget is exhausted, and or all the labeled task-specific examples 318 have been exhausted.

First Example Method

Figure 4:
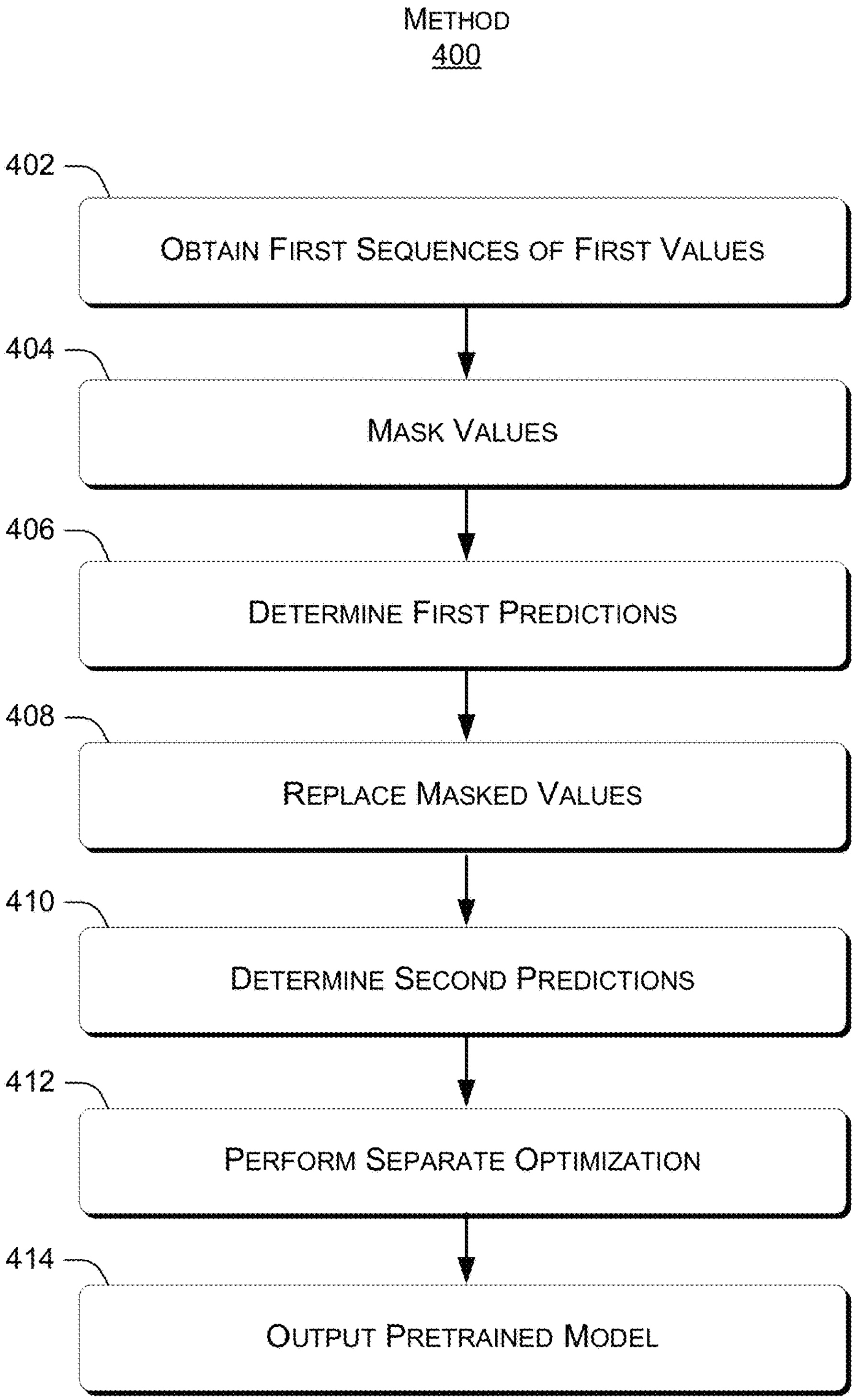
FIG. 4 illustrates an example method or technique for pretraining of a machine learning model, consistent with some implementations of the present concepts.

FIG. 4 illustrates an example method 400, consistent with the present concepts. As discussed more below, method 400 can be implemented on many different types of devices, e.g., by one or more cloud servers, by a client device such as a laptop, tablet, or smartphone, or by combinations of one or more servers, client devices, etc.

Method 400 begins at block 402, where a first sequence of first values is obtained. In natural language implementations, the first sequence of first values can be a sequence of tokens from text, e.g., extracted a corpus of pretraining data of documents written by humans.

Method 400 continues at block 404, where one or more of the first values in the first sequence are masked. For instance, in natural language implementations, one or more tokens can be masked and replaced with a [mask] token. In some cases, tokens are masked randomly.

At block 406, a first machine learning model determines first predictions of the masked values. For instance, the first machine learning model can be a generator that outputs a probability distribution for a masked token based on surrounding tokens (e.g., preceding and/or subsequent tokens).

Method 400 continues at block 408, where the masked values are replaced with the first predictions to obtain second sequences of second values. For instance, the probability distribution output by a generator can be randomly sampled to select a particular token with which to replace a given masked token. The remaining tokens in the second sequences can be the same tokens, in the same positions, as in the first sequences.

Method 400 continues at block 410, where a second machine learning model determines second predictions of whether the second values were present in the first sequences or replaced by different values predicted by the first machine learning model. For instance, the second machine learning model can be a discriminator that predicts whether a given token was originally present in the same position in a first sequence from a text corpus, or was replaced by a different token output by a text generator.

Method 400 continues at block 412, where separate optimization of the first machine learning model and the second machine learning model is performed. For instance, in some cases, a first instance of Adam optimization (or another adaptive optimizer) is applied to the generator based on the first predictions and a second instance of Adam optimization (or another adaptive optimizer) is applied to the discriminator based on the second predictions. In some cases, both the generator and discriminator include encoders that do not share parameters with each other, e.g., do not share token embeddings.

Method 400 continues at block 414, where a pretrained model is output. For instance, the pretrained model can be the second model having parameters (weights, bias values, embeddings, etc.) that are learned via separate optimization at block 412. As noted, the pretrained model can include at least the encoder of the discriminator. For instance, the pretrained model can be output to permanent storage, from one computing module in memory to another, sent over a network to another device for tuning, etc.

Second Example Method

Figure 5:
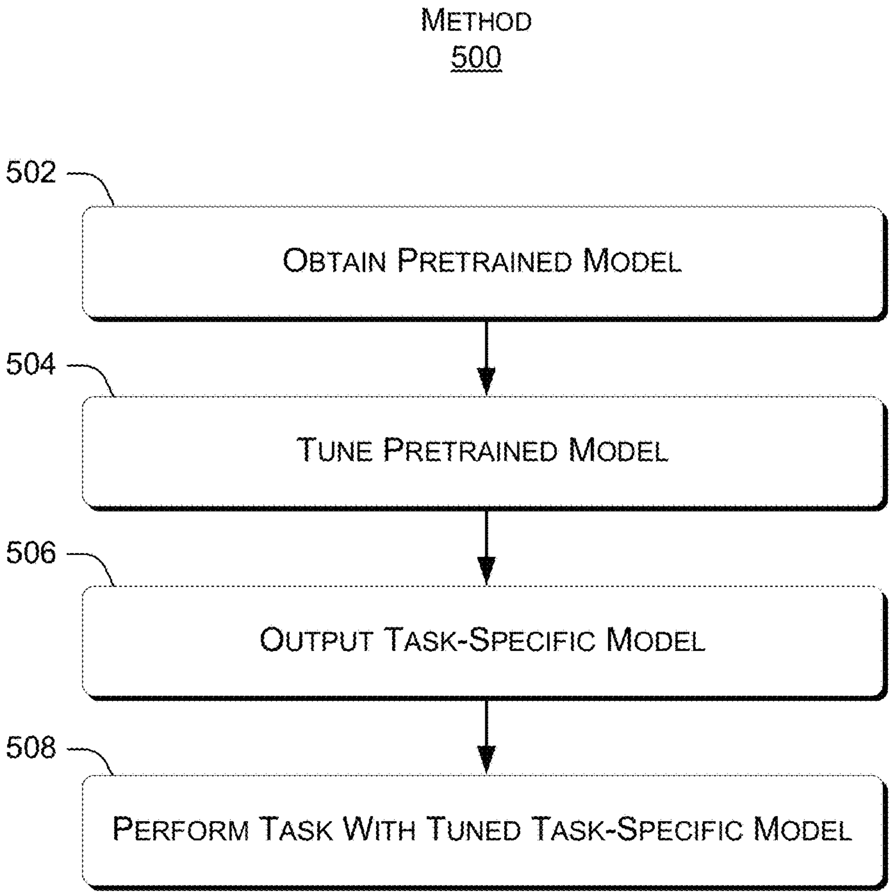
FIG. 5 illustrates an example method or technique for tuning and employing a machine learning model, consistent with some implementations of the present concepts.

FIG. 5 illustrates an example method 500, consistent with the present concepts. As discussed more below, method 500 can be implemented on many different types of devices, e.g., by one or more cloud servers, by a client device such as a laptop, tablet, or smartphone, or by combinations of one or more servers, client devices, etc.

Method 500 begins at block 502, where a pretrained model is obtained. For instance, the pretrained model can be a main model having parameters (weights, bias values, embeddings, etc.) that are learned via separate optimization with an auxiliary model as described above. As noted, the pretrained model can include an encoder from a pretrained discriminator. For instance, the pretrained model can be obtained from permanent storage, from memory, received over a network from another device, etc.

Method 500 continues at block 504, where the pretrained model is tuned for a particular task. For example, one or more task-specific layers can be added to the pretrained encoder of the discriminator and the entire model can be tuned using labeled training data for a particular task, resulting in a tuned machine learning model for that task. Thus, tuning can involve adjusting both the pretrained parameters of the encoder as well as parameters of the one or more task-specific layers.

Method 500 continues at block 506, where a tuned task-specific model is output. For instance, the tuned task-specific model can be output to permanent storage, from one computing module in memory to another, sent over a network to another device for performing a particular task, etc.

Method 500 continues at block 508, where a task is performed with the tuned task-specific model. For instance, input data can be provided to the tuned task-specific model, which can process the input data to output predictions. In some implementations, the input data can include a query and the tuned task-specific model can predict an intent of the query result. The predicted intent can be used to determine query results, which can be sent in reply to the query.

Example System

Figure 6:
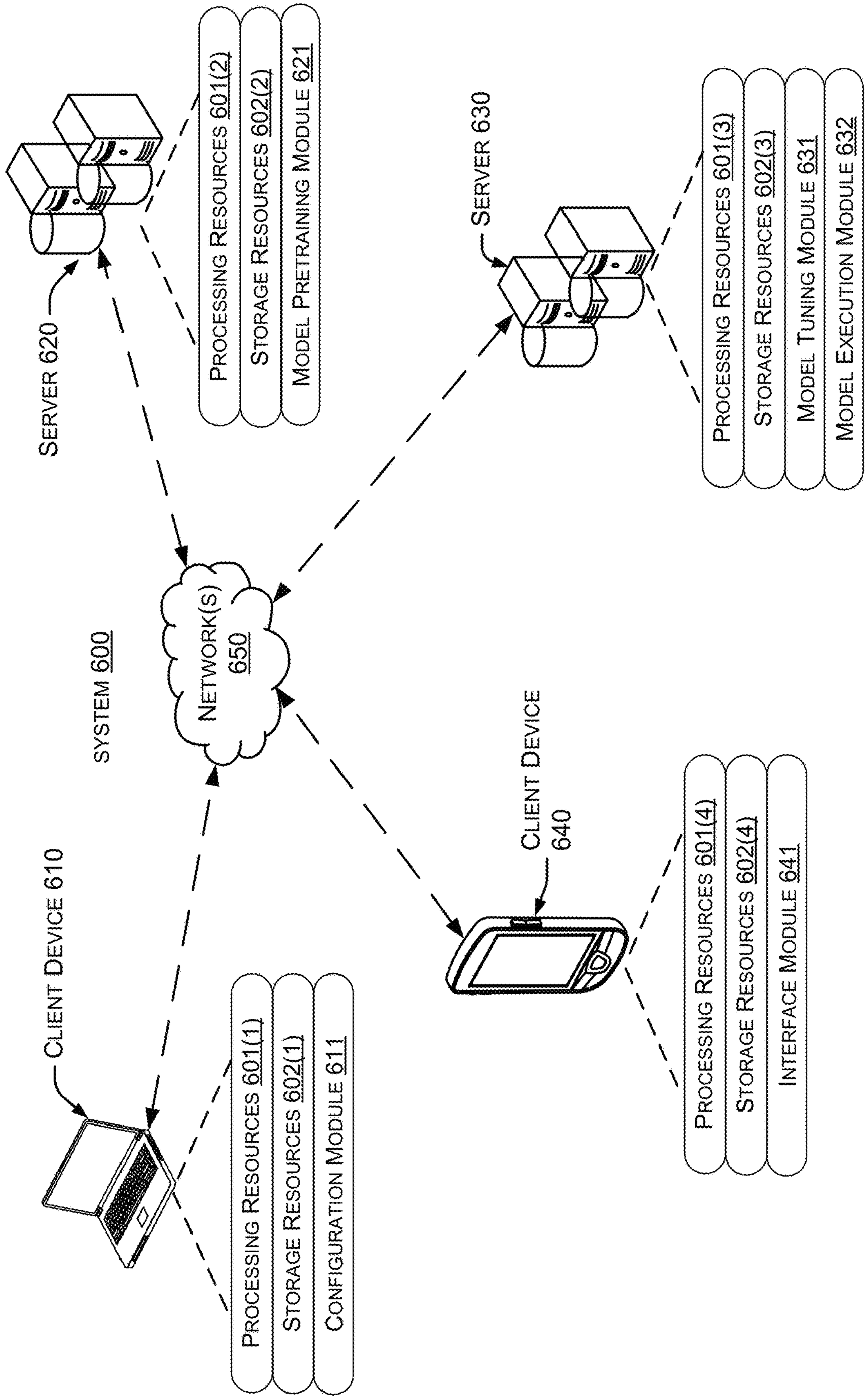
FIG. 6 illustrates an example system, consistent with some implementations of the present concepts.

The present implementations can be performed in various scenarios on various devices. FIG. 6 shows an example system 600 in which the present implementations can be employed, as discussed more below.

As shown in FIG. 6, system 600 includes a client device 610, a server 620, a server 630, and a client device 640, connected by one or more network(s) 650. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 6, but particularly the servers, can be implemented in data centers, server farms, etc.

Certain components of the devices shown in FIG. 6 may be referred to herein by parenthetical reference numbers. For the purposes of the following description, the parenthetical (1) indicates an occurrence of a given component on client device 610, (2) indicates an occurrence of a given component on server 620, (3) indicates an occurrence on server 630, and (4) indicates an occurrence on client device 640. Unless identifying a specific instance of a given component, this document will refer generally to the components without the parenthetical.

Generally, the devices 610, 620, 630, and/or 640 may have respective processing resources 601 and storage resources 602, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 610 can include a configuration module 611 that can interact with a model pretraining module 621 on server 620. Generally speaking, the configuration module can provide certain configuration parameters to the model pretraining module. The configuration parameters can include architecture parameters and pretraining parameters (e.g., hyperparameters). The architecture parameters can specify the structure of a machine learning model, e.g., the number of nodes, arrangement of the nodes in layers, connectivity of the nodes and/or layers, etc. The architecture parameters can also specify input data and output data for each node and/or layer.

The configuration parameters can also include pretraining parameters that specify information such as learning rates or other hyperparameters (e.g., learning rates), unsupervised or self-supervised learning parameters and/or data sources, and/or supervised learning parameters and/or data sources. The model pretraining module 621 uses these training configuration parameters to perform model pretraining functionality on a model specified by the architecture parameters. In particular, the model training module can perform method 400 based on the pretraining configuration parameters. As just one example, the unsupervised learning data sources can include one or more repositories of sentences.

The model pretraining module 621 can output a pretrained model to server 630. Model tuning module 631 can tune the pretrained model, e.g., using supervised learning data sources such as task-specific labeled training examples (e.g., by performing blocks 502, 504, and 506 of method 500). Model execution module 632 can execute the final model in response to received inputs, e.g., performing block 508 of method 500. For example, the interface module 641 on client device 640 can provide input data to the model execution module for evaluation on any of the tasks provided in the task-specific layers. The model execution module can process the uploaded input data using the final model and provide model outputs in response by sending the model outputs to the client device 640 over network(s) 650.

Example Labeled Training Data

Figure 7:
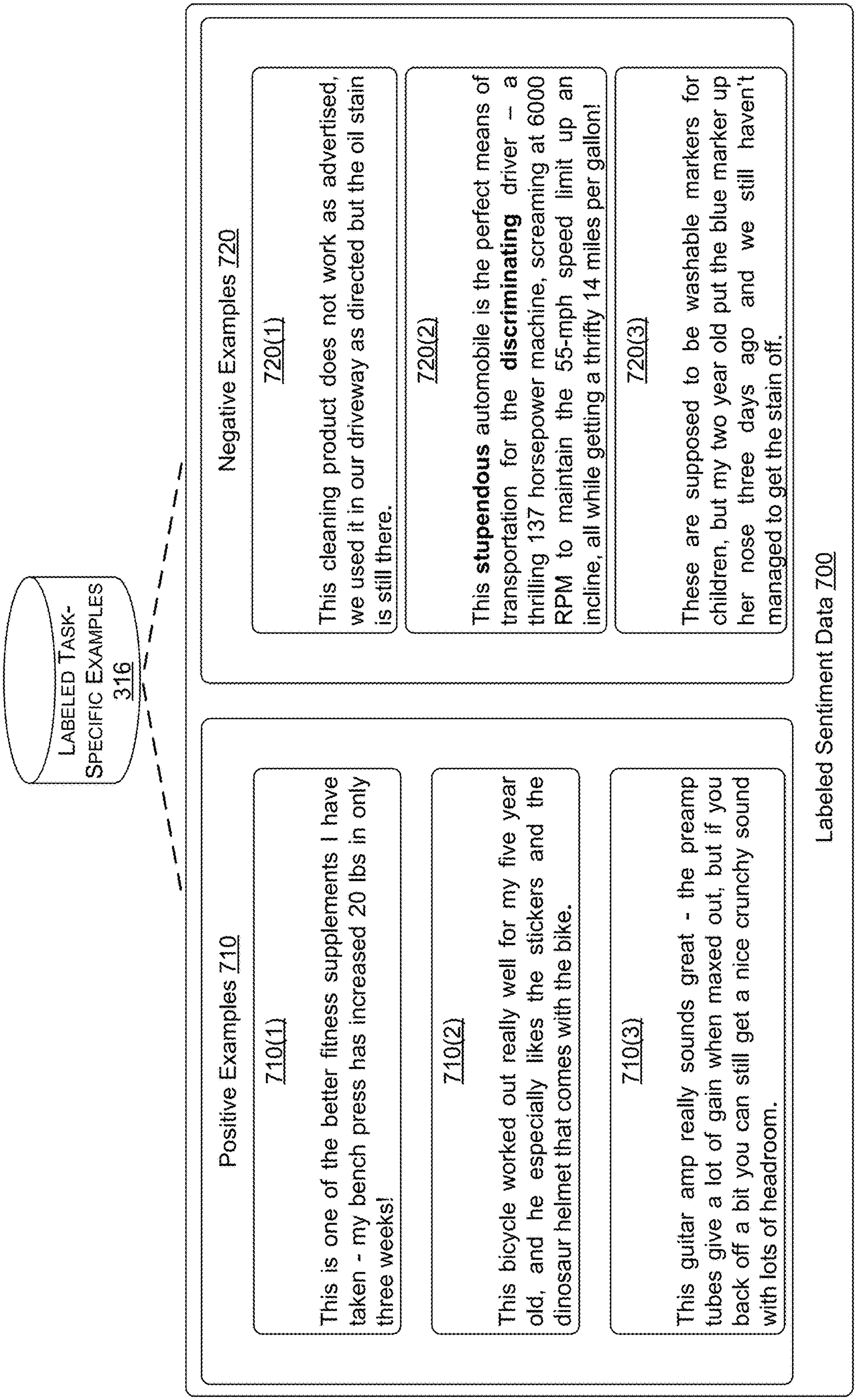
FIG. 7 illustrates examples of labeled task-specific training data, consistent with some implementations of the present concepts.

FIG. 7 shows an example of labeled sentiment data 700 that can be used to train a task-specific layer to perform classification of sentences for positive or negative sentiment. Labeled sentiment data can be provided in labeled task-specific examples 318 for use in training workflow 300, as described previously.

Labeled sentiment data includes positive examples 710 and negative examples 720. Each positive example 710 includes a label indicating that a human or automated agent has manually labeled that sentence as indicating a positive sentiment, and each negative example 720 includes a label indicating that a human or automated agent has manually labeled that sentence as indicating a negative sentiment.

Output Examples

Figure 8:
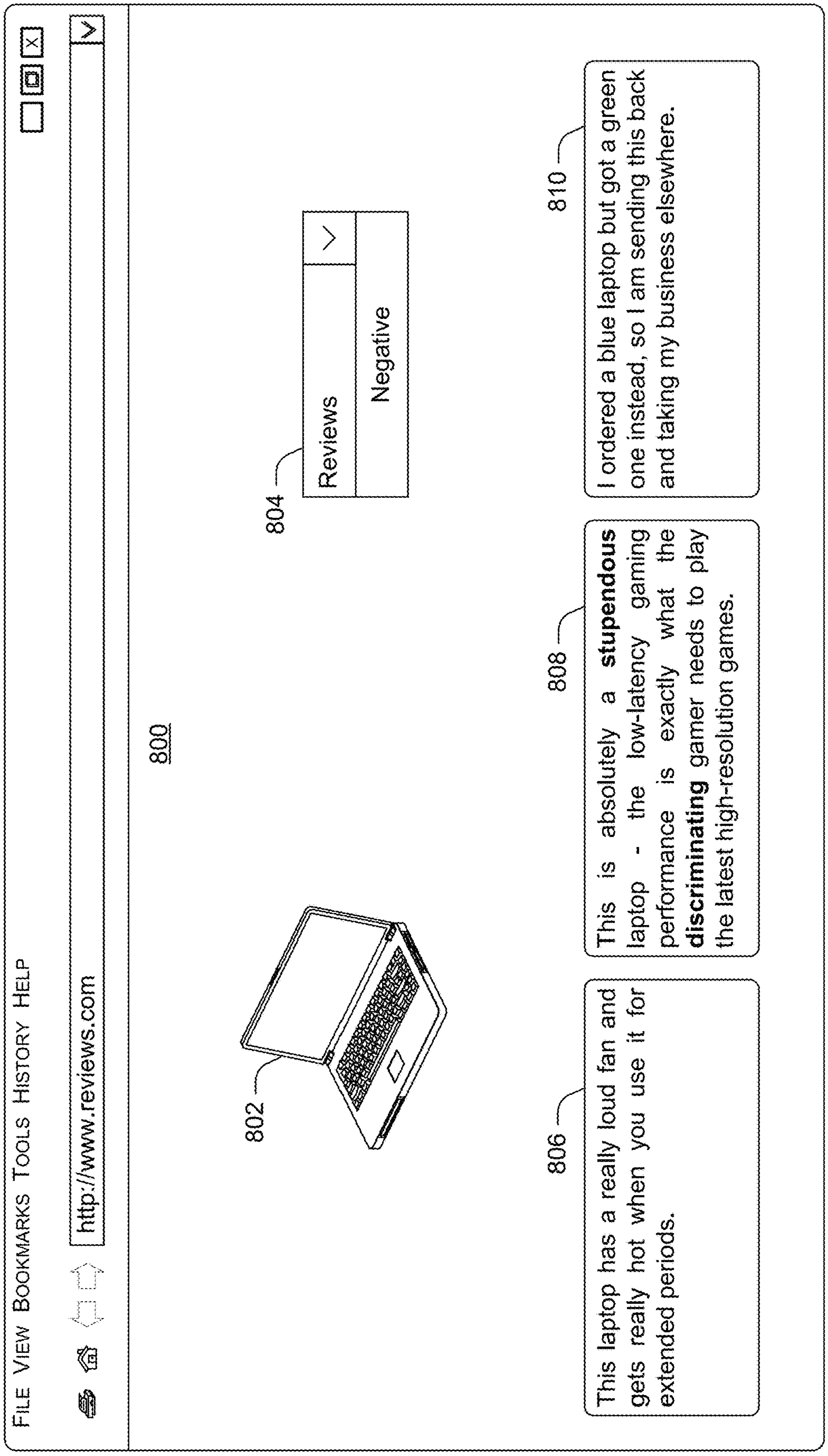
FIGS. 8 and 9 illustrate example graphical user interfaces that can be employed, consistent with some implementations of the present concepts.

FIG. 8 illustrates an example review page 800 for a laptop 802. Here, a user has selected to filter for negative reviews via a drop-down menu 804, and in response the review page shows three reviews, 806, 808, and 810. Review 806 and review 810 are clearly negative reviews and thus are appropriate to display to the user in response to their request for negative reviews. However, review 808 is a very positive review of the laptop. A discriminator-based model that is pretrained using coupled optimization with a generator as described above could mischaracterize this review as negative, because the embeddings learned during pretraining may not accurately reflect the meaning of terms such as "stupendous" and "discriminating."

Figure 9:
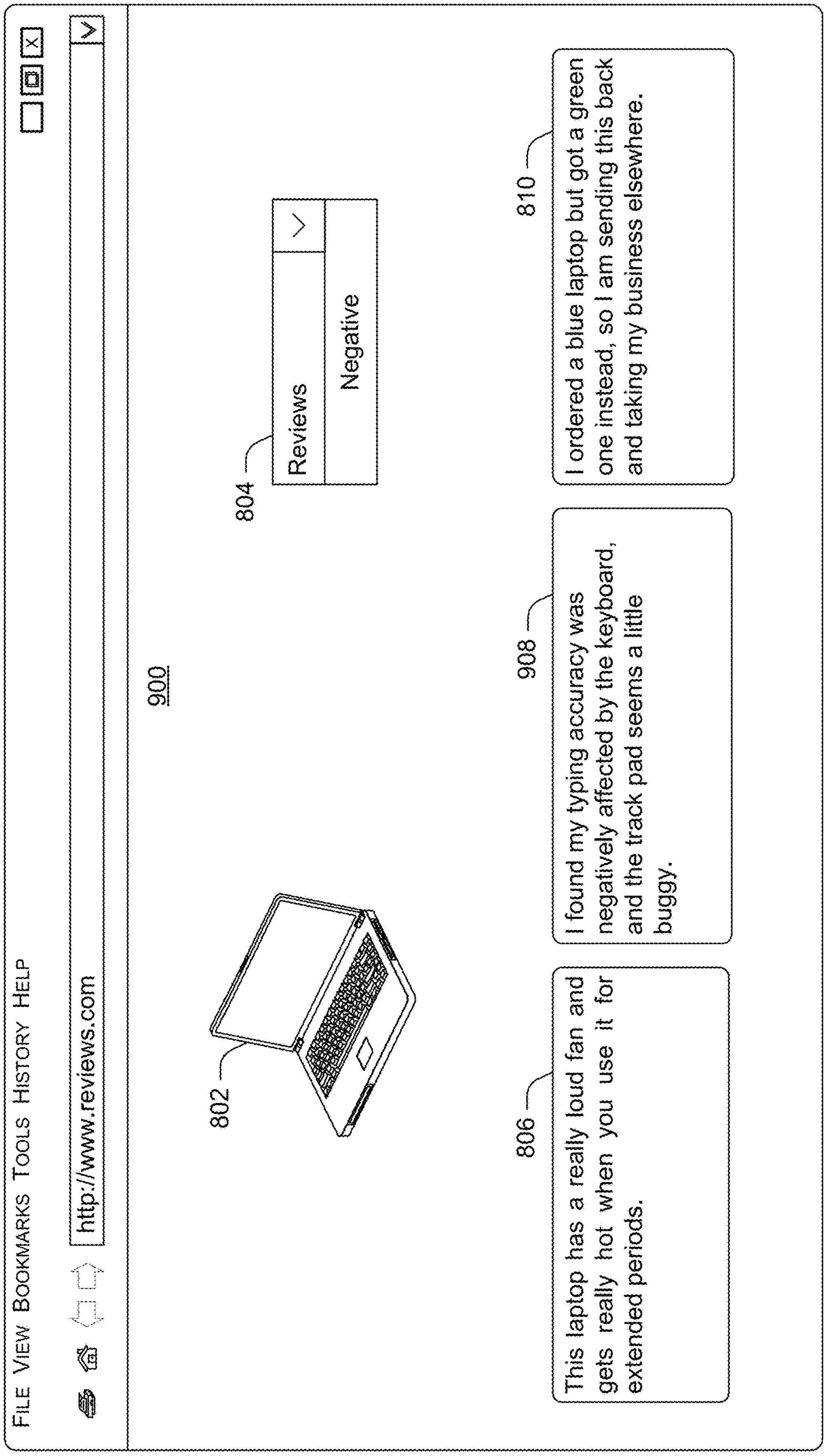

FIG. 9 illustrates an example review page 900 for laptop 802 that could be produced using the disclosed techniques. Here, review 808 has been replaced by review 908, which is actually a negative review and thus correctly displayed to a user who wishes to see negative reviews for the laptop. Because the disclosed implementations can learn discriminator embeddings that more accurately reflect the meaning of certain terms, e.g., "stupendous" and "discriminating" in this example, the task-specific model tuned from the discriminator can more accurately predict the sentiment of reviews having those terms.

Specific Algorithms and Experimental Results

The following section describes specific algorithms for decoupled optimization of models, and also presents experimental results obtained by tuning a model that has been pretrained using decoupled optimization. In the discussion below, MLNI refers to Multi-genre Natural Language Inference, and is a data set with sentence pairs annotated for textual entailment relationships. QQP refers to Quora Question Pairs, which is a dataset of question pairs annotated to indicate whether the questions duplicate the meaning of each other. RTE refers to Recognizing Textual Entailment, which is a dataset of sentences labeled to indicate whether the meaning of one sentence can be inferred from the other. QNLI refers to a question-answering dataset with questions and corresponding answers to the questions that are identified in spans of text provided in the dataset. MPRC refers to Microsoft Research Paraphrase Corpus, a dataset of sentences labeled with paraphrase relationships indicating whether one sentence accurately paraphrases another. CoLA refers to Corpus of Linguistic Acceptability, which is a dataset of sentences labeled for grammatical acceptability. SST refers to Stanford Sentiment Treebank, which is a dataset of examples labeled with positive or negative sentiments expressed by the examples. STS-B refers to Semantic Textual Similarity Benchmark, which is a dataset with labels indicating similarity between two sentences.

Coupled Optimization

While pretraining using coupled optimization can be effective, the performance of the resulting models is dependent on the careful selection of the model size for the auxiliary generator, leading to high trial-and-error costs. The following highlights the importance of controlling the generator capacity in coupled optimization training. Adaptive optimizers like Adam can cause the weighing of individual losses to be ineffective in coupled optimization, and thus coupled optimization can fail to control the generator training effectively. To regain the control over the generator, the disclosed implementations can decouple the generator optimizer and discriminator optimizer instances, instead of relying on a weighted objective combination of the generator and discriminator. This technique reduces the sensitivity of coupled optimization pretraining significantly and obtains considerable performance gain compared to the original design.

One example of coupled optimization is ELECTRA-style pretraining, as introduced in Clark, et al., (2020), *Pre-training text encoders as discriminators rather than generators*, Preprint at https://arxiv.org/abs/2003.10555. ELECTRA has demonstrated significant potential in enhancing the effectiveness and efficiency of training large language models (LLMs). ELECTRA trains the discriminator model (main model that is used in downstream tasks) to detect which tokens in an input sequence were replaced by the generator model (auxiliary model that is not used in downstream tasks).

Figure 10:
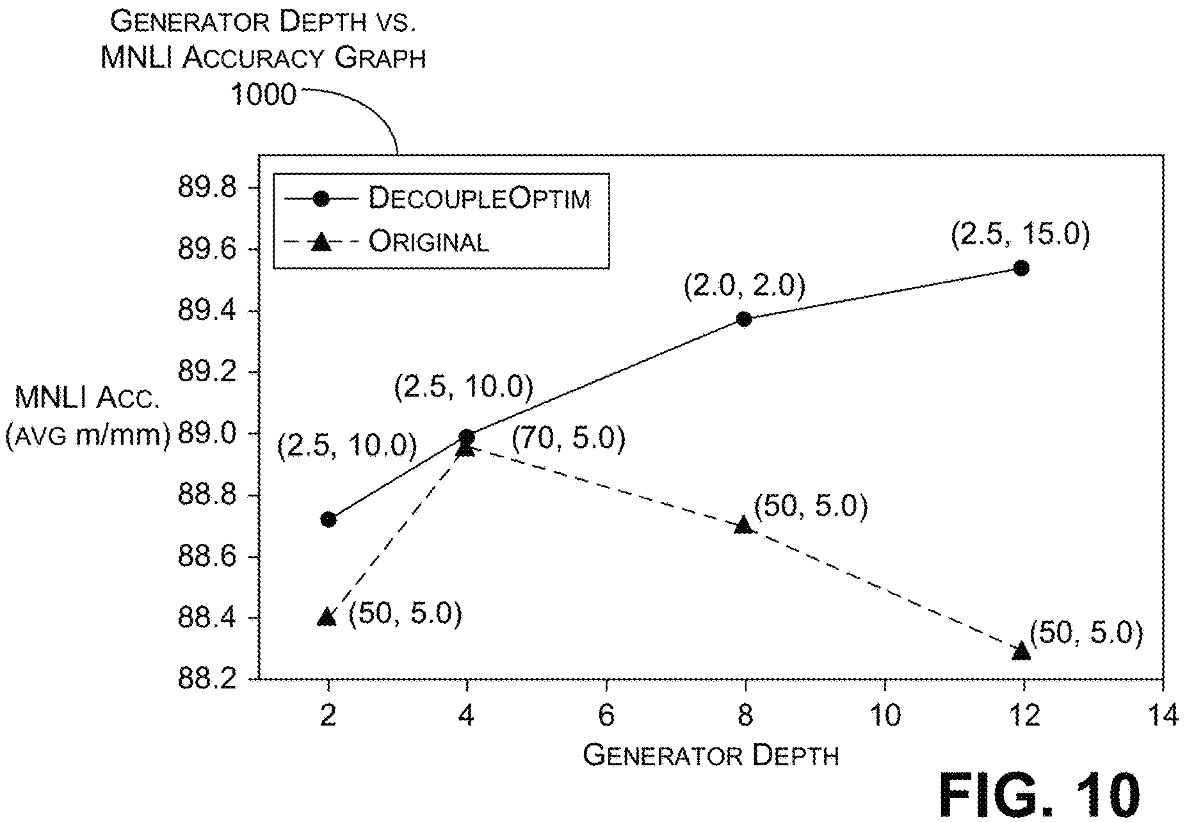
FIGS. 10-16 illustrate experimental results obtained using, some implementations of the present concepts.

Despite its effectiveness, the performance of ELECTRA is sensitive to the choice of generator size. As depicted in FIG. 10 via generator depth vs. MNLI accuracy graph 1000, variations in generator size can lead to a significant decline in the performance upon fine-tuning the discriminator on downstream tasks. Such sensitivity can be addressed by careful selection of the generator size in real-world practices, but this can be time-consuming and resource-intensive.

The following evaluation of the discriminator's capability of detecting replaced tokens confirms that large generator capacity can hurt the effectiveness of pretraining. The evaluation also confirms the performance degradation occurs during the pretraining stage, instead of during the fine-tuning stage. Coupled optimization techniques such as ELETRCA may fail to control the generator capacity effectively in the course of pretraining, by relying on a weight ratio that combines the training objectives of the generator and the discriminator, in the expectation of balancing their optimization. However, this method is observed to be largely ineffective since a constant scaling of the loss will not affect adaptive optimizers like Kingma, et al., (2014), *Adam: A method for stochastic optimization*, arXiv preprint arXiv:1412.6980.

To regain control over the generator training, the disclosed implementations perform generator optimization separately from discriminator optimizer. This technique, referred to below as DecoupledOptim, effectively mitigates the sensitivity of ELECTRA-style pretraining to the generator size and regain the performance loss caused by a large generator. Furthermore, the disclosed techniques can foster the flexibility of accelerating discriminator optimization without being impeded by the instability of generator training, thus bringing significant performance gain over strong baselines. The following experiments were conducted with the standard BERT base and BERT large, Devlin, et al., (2018), *Bert: Pre-training of deep bidirectional transformers for language understanding*, arXiv preprint arXiv:1810.04805, pretraining setting on the GLUE, Wang, et al., (2018), *GLUE: A multi-task benchmark and analysis platform for natural language understanding*, arXiv preprint arXiv:1804.07461, benchmark, and the disclosed techniques consistently outperform conventional pretraining techniques.

Masked Language Modeling Pretraining

Masked Language Modeling (MLM). MLM methods such as BERT pretrain the language model to predict randomly masked tokens in a sequence. Specifically, given an input sequence $x=[w_1, w_2, \ldots, w_n]$, MLM generates a masked sequence $\tilde{x}=[w_1, \ldots, |[\text{mask}]|, \ldots, w_n]$ by randomly selecting a few tokens at positions $\mathcal{M}=[i_1, i_2, \ldots, i_m]$ and replace them with [mask] token. The model is then trained to predict the original tokens given the masked sequence $\tilde{x}$. The training objective can be formulated as:

$$L(\theta) = \mathbb{E}_x \sum_{i\in\mathcal{M}} -\log p_\theta(w_i \mid \tilde{x})_i,$$

where $\theta$ denotes the model parameters and $p_\theta(w_i|\tilde{x})_i$ is the predictive probability of the model at the i-th position on token $w_i$ given the masked sequence $\tilde{x}$.

Replaced Token Detection Pretraining

Unlike MLM, ELECTRA constructs a pretraining task called Replaced Token Detection (RTD), which involves the joint training of two deep neural models, a generator G (auxiliary model) and a discriminator D (main model). Here the generator is pretrained with MLM as usual, while the discriminator is pretrained to detect tokens in a sequence that are replaced by a generator.

Specifically, given a masked sequence $\tilde{x}$ constructed for MLM, a corrupted sequence $\hat{x}$ is generated by replacing each [mask] token in $\tilde{x}$ by a token that is sampled from the generator's predictive distribution at that [mask] token, namely $\hat{x}=[w_1, \ldots, \hat{w}_i, \ldots, w_n]$ and $\hat{w}_i \sim p_G(\cdot|\tilde{x})_i$. The following refers to those sampled tokens as replaced tokens since they will be different from the original tokens at corresponding positions, as long as the generator does not predict the masked tokens correctly with a one-hot probability distribution. The discriminator is then trained to predict whether the replaced tokens in $\hat{x}$ match the original tokens. The training objective can thus be defined as $$L_G(\theta_D) = \mathbb{E}_x \sum_{i\in\mathcal{M}} E_{\hat{w}_i\sim p_G} \ell\left(D(\hat{x}), 1_{\hat{w}_i=w_i}\right) + \mathbb{E}_x \sum_{i\in[n]\setminus\mathcal{M}} \ell(D(\hat{x})_i, 1),$$

where $D(\hat{x})_j$ is a scalar score output by the discriminator quantifying the probability of the j-th token being replaced, $\ell$ is a loss function, typically binary cross-entropy (BCE), and $1_{\hat{w}=w}$ is the indicator function, namely $$1_{\hat{w}=w} = \begin{cases} 1, & \text{if } \hat{w} = w, \\ 0, & \text{if } \hat{w} \neq w. \end{cases}$$

Note that in ELECTRA, the training objective of the discriminator is defined over all input tokens rather than the randomly masked subset such as that in MLM.

Impact of Generator Capacity

In ELECTRA-style pretraining, optimal discriminator performance can only be obtained by a generator that is neither too large nor too small. As shown in FIG. 10, generators with more than 4 layers consistently hurt the discriminator performance on downstream tasks. As discussed more below, this is in part because large generator capacities involve slower pretraining of the discriminator.

Figure 11:
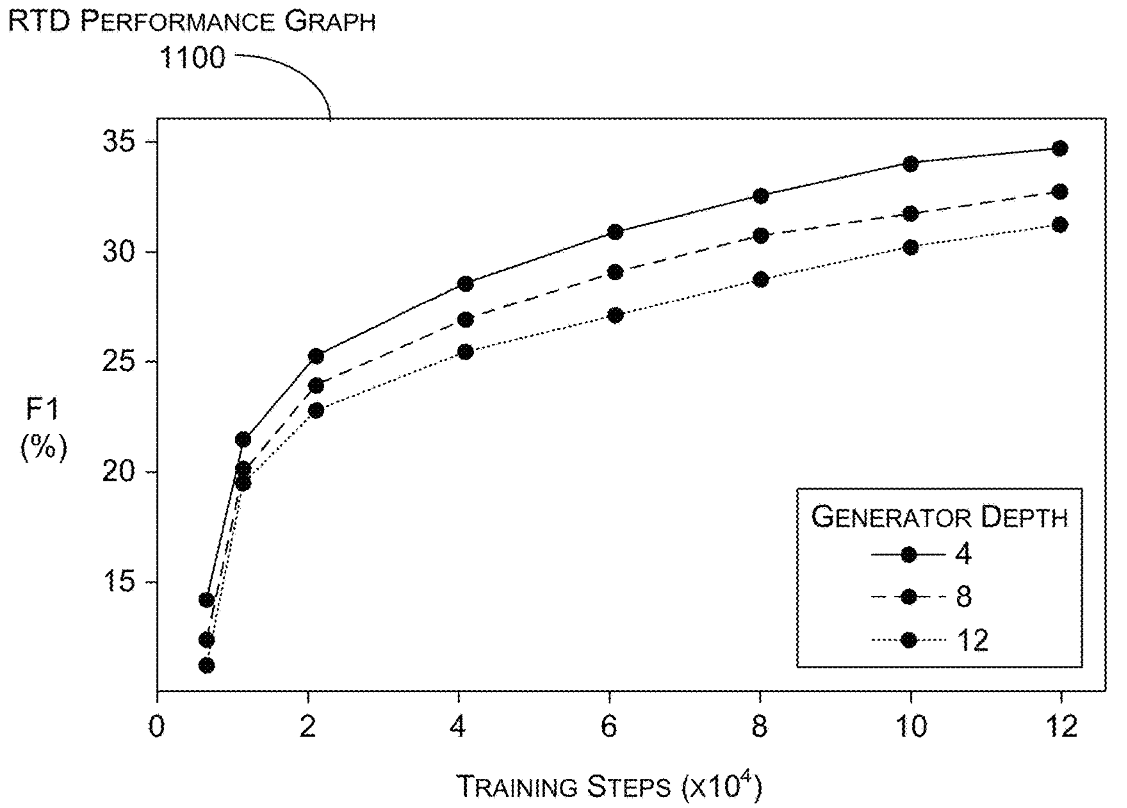

The following experiments evaluate the performance of the pretrained model in a two-stage setting (i.e., pretraining and fine-tuning) to determine whether the performance degradation happens in the pretraining stage (i.e., the discriminator is not trained properly) or the fine-tuning stage (i.e., the discriminator is not fine-tuned properly). The results indicate that performance degradation has already occurred during the pretraining stage. For instance, as shown in FIG. 11 by RTD performance graph 1100, discriminators trained with deeper generators achieve consistently worse RTD performance, echoing their inferior performance on downstream tasks as shown in FIG. 10.

Observe that to achieve better RTD performance against a deep generator, training the discriminator on a shallow generator can be more effective than training the discriminator on that deep generator itself. As shown in FIG. 11, the discriminator trained with the 12-layer generator performed the worst on replaced tokens sampled from this very same generator, compared to other discriminators trained with either the 4-layer or the 8-layer generator. This observation implies that the discriminator trained with a deep generator is not fully optimized in terms of their pretraining objectives and that the performance degradation may be due to a slow convergence in the course of pretraining.

As noted above, controlling the generator capacity is important to the optimization of ELECTRA. However, the coupled optimization involved in ELECTRA may be deficient in controlling the generator capacity. In ELECTRA, a loss weight λ is originally introduced to balance the generator optimization and discriminator optimization. Specifically, the generator and the discriminator are jointly optimized through the following combined training loss:

$$L = L(\theta_G) + \lambda L_G(\theta_D).$$

However, varying the value of A may not take effect as expected. First, a constant scaling of the loss will not affect adaptive optimizers like Adam, which can be used in pretraining algorithms such as ELECTRA to ensure training stability. Specifically, Adam updates a model parameter by the ratio between the first moment and second moment of its gradient, namely $$\theta := \theta - \eta \cdot \frac{\mathbb{E}[g(\theta)]}{\sqrt{\mathbb{E}\left[g(\theta)^2\right]}}, \tag{1}$$

where η is the learning rate, and $g(\theta)=\nabla_\theta L$ is the gradient of the model parameter θ with respect to L.

Consequently, for all generator parameters that are not shared with the discriminator (denoted as $\hat{\theta}_G$) and all discriminator parameters that are not shared with the generator ($\hat{\theta}_D$):

$$g(\hat{\theta}_G) = \nabla L(\theta_G),\ \ g(\hat{\theta}_D) = \lambda \cdot \nabla L_G(\theta_D).$$

It is important to note that the loss weight λ does not affect the update rule of these parameters as any constant scaling of the gradients will be canceled out in Equation (1). Therefore, these parameters would be trained with the same learning rate regardless of the value of λ.

The only parameters in ELECTRA that are affected by the loss weight λ are the embeddings $\theta_E$ shared between the generator and the discriminator. The gradients would be $$g(\theta_E) = \nabla L(\theta_G) + \lambda \cdot \nabla L_G(\theta_D),$$

which means the update rule would become $$\theta_E := \theta_E - \eta \cdot \frac{\mathbb{E}[\nabla L(\theta_G) + \lambda \cdot \nabla L_G(\theta_D)]}{\sqrt{\mathbb{E}\left[(\nabla L(\theta_G) + \lambda \cdot \nabla L_G(\theta_D))^2\right]}}$$

Therefore, the updates of these embeddings will be contributed by the gradients from the discriminator more if λ is larger.

Figure 12:
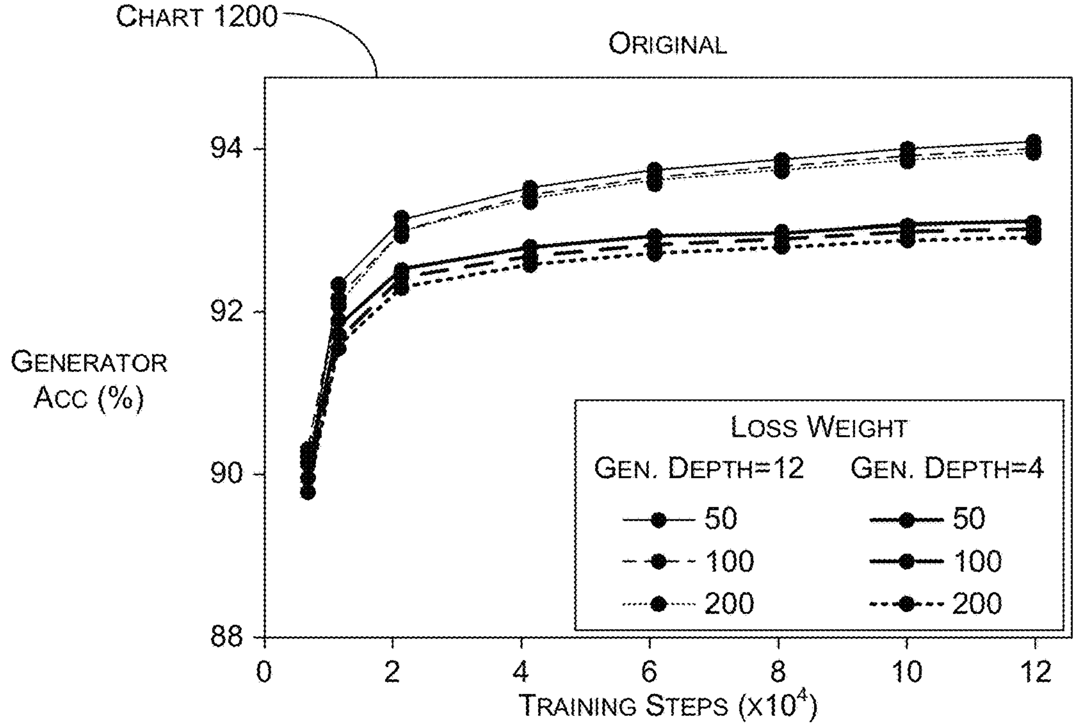

Since the loss weight λ fails to balance the updates of the majority of model parameters, it cannot control the generator learning effectively. As shown in FIG. 12 via coupled pretraining generator accuracy chart 1200, increasing the loss weight λ has little effect on the generator performance in the original ELECTRA design. Another way to control generator learning is to change the learning rate η. However, this would also alter the learning rate for the discriminator learning and ultimately results in worse pretraining performance. Another way is to reduce the model size of the generator, as also shown in FIG. 12. While effective, it brings about the dependency of the pretraining performance on the careful selection of the generator size, which can be time-consuming and resource-intensive in practice.

Decoupled Optimization

To control the generator capacity, the disclosed implementations decouple the generator optimizer and the discriminator optimizer. Specifically, the generator and discriminator parameters are now updated with separate rules, namely:

$$\theta_G := \theta_G - \eta_G \cdot \frac{\mathbb{E}[g(\theta_G)]}{\sqrt{\mathbb{E}\left[g(\theta_G)^2\right]}},\ \ \theta_D := \theta_D - \eta_D \cdot \frac{\mathbb{E}[g(\theta_D)]}{\sqrt{\mathbb{E}\left[g(\theta_D)^2\right]}}.$$

Figure 13:
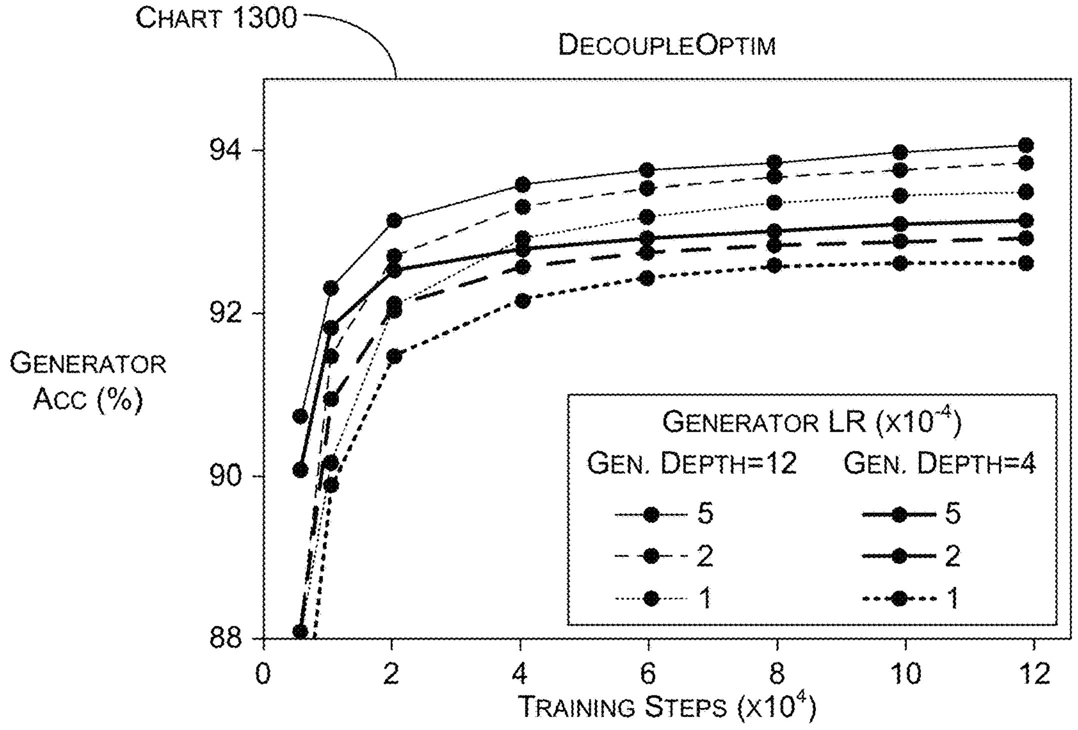

To control generator capacity, the disclosed implementations adjust the optimizer instance for the generator (e.g., adjusting $\eta_G$, the generator learning rate). FIG. 13 shows a decoupled pretraining generator accuracy chart 1300 shows that, for a large generator, reducing $\eta_G$ can effectively control generator capacity during the pretraining.

This implies that DecoupledOptim is capable of handling large generators and reducing the sensitivity of ELECTRA-style pretraining on the choice of the generator size. As described further below, this approach outperforms the original ELECTRA design as well as other variants thereof.

In some implementations, embeddings are not shared between the generator and the discriminator, unlike ELECTRA which does share embeddings. The following results show that with decoupled optimization, a discriminator learned from randomly initialized embeddings performs quite well.

In addition, with a decoupled-optimizer design, not only can generator capacity be controlled more easily but better pretraining performance can be obtained by increasing the discriminator learning rate. In the original ELECTRA design, the same learning rate is assigned to the generator and discriminator. Therefore, attempts to speed up discriminator optimization by increasing the learning rate lead to larger generator capacity, thus yielding worse pretraining performance. Further, increased learning rate may even cause training failure since the generator training in an MLM style can become unstable with a large learning rate. The original ELECTRA design diverges within 25K training steps, even with a conservative selection of the loss weight (e.g., 50) and the generator size (e.g., 4 layers).

Figure 14:
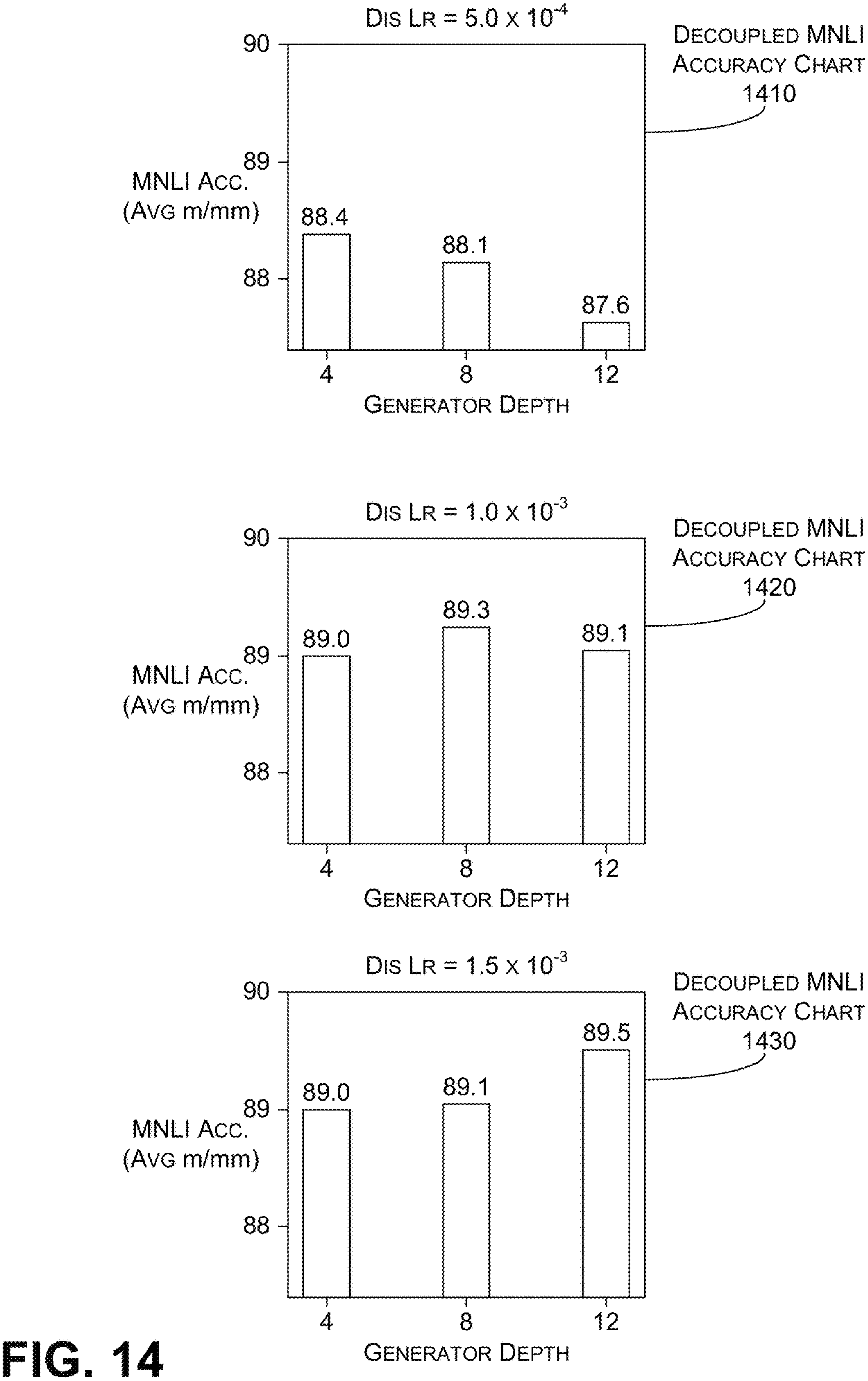

However, with the optimizers decoupled in DecoupledOptim, discriminator optimization can be accelerated without being impeded by generator learning. Empirical experiments in FIG. 14 show via decoupled MNLI accuracy charts 1410, 1420, and 1430, as the discriminator learning rate is increased, the pretraining performance tends to improve. Note that the discriminator learning rate can often be as large as $1.5\times10^{-3}$, which is 3-7 times the learning rate suitable for generator training. Furthermore, observe that with improved discriminator optimization, the best generator shifts to one with a larger capacity, even as large as the discriminator itself (12 layers).

Analysis

Consider a simplified RTD task where only one token in an input sequence is replaced, referring to the rest of those unchanged tokens in this sequence as context. Let w be a word in the sentence, and let c be the remaining context words in the same sentence. The generator is trained to predict the original token given the context, namely:

$$L(\theta_G) = \mathbb{E}_{c,w} - \log p_G(w|c) \tag{2}$$

For discriminator training, the detection of this single replaced token is considered. The optimization objective of the discriminator D can be thus described as:

$$\bar{L}_G(\theta_D) = \mathbb{E}_{c,w}\mathbb{E}_{\hat{w}\sim p_G}\ell(D(c,\hat{w}), 1_{\hat{w}=w}) \tag{3}$$

An ideal discriminator optimization objective should align with the discriminator performance on downstream tasks. However, discriminator performance evaluated against a given replaced token distribution may not always be indicative of the downstream performance. Ideally, a discriminator should be able to detect any possible tokens replaced in a sequence, regardless of the specific distribution from which such replaced tokens are sampled. To this end, define the ideal optimization objective of the discriminator as the highest possible discriminator loss achieved by any replaced token distribution, namely the probability distributions from which the replaced tokens are sampled.

Definition 1 (Ideal optimization objective of the discriminator) Let $\mathcal{P}$ be a family of replaced token distributions. The ideal optimization objective of the discriminator D can be defined as:

$$L^*(\theta_D) = \mathbb{E}_{c,w}\sup_{p\in P}\mathbb{E}_{\hat{w}\sim p}\ell(D(c,\hat{w}), 1_{\hat{w}=w}) \tag{4}$$

In practice, such an ideal optimization objective may be difficult as a loss function for training the discriminator since it is not necessarily feasible to enumerate all possible replaced token distributions. However, by making an assumption on the "difficulty" of the replaced token distributions, the highest discriminator loss can be bounded over all possible replaced token distributions. This upper bound can further be approached by the discriminator loss on the generator's predictive distribution as a replaced token distribution. Hence, the optimization objective defined by a generator (i.e., Equation (3)) can be a fair surrogate of the ideal objective.

Assume a discriminator is more likely to make detection errors if the sampled replaced tokens recover the original token more frequently, namely:

$$\mathbb{E}_{\hat{w}\sim p}\ell(D(c,\hat{w}), 1_{\hat{w}=w}) = F_D\left(\mathbb{E}_{\hat{w}\sim p}[1_{\hat{w}=w}]\right) \tag{5}$$

where $F_D$: $[0,1]\to\mathbb{R}^+$ is a concave and monotonically increasing function that is dependent on the discriminator D. Note that the ideal discriminator objective is bounded by the surrogate objective defined by a generator. The intuition here is that, given Assumption 1, the predictive distribution of the generator should approximate the most difficult replaced token distribution, and the approximate error happens to be bounded by the performance of the generator.

Lemma 1 (The discriminator objective defined by a generator is a surrogate of the ideal objective). Let $m_D=\max_{c,w}\|\ell(D(c,\hat{w}), 1_{\hat{w}=w})\|_2$ be the upper bound on the discriminator loss given any context-token pairs, yielding:

$$L^*(\theta_D) \le \bar{L}_G(\theta_D) + 2^{-1/2}m_D L(\theta_G)^{1/2} \tag{6}$$

Lemma 1 implies that training towards a surrogate objective defined by a generator $L_G(\theta_D)$ can indeed optimize the ideal discriminator objective. This justifies the basic ELECTRA design which employs a generator to sample replaced tokens for discriminator training. It also implies that an underperformed generator may not be as effective for optimizing the ideal objective since the distribution approximation error (the second term) would be much higher.

However, well-performed generators may be less effective for optimizing the ideal objective as well. This is because well-performed generators will approach the most difficult replace token distribution based on Assumption 1, thus creating significantly higher discriminator loss $L_G(\theta_D)$ in Equation (6), as demonstrated by Lemma 2 (Dependence of the discriminator loss on generator performance). Let $V_G=\mathbb{E}_{c,w}[(-\log p_G(w|c)-L(\theta_G))^2]$ be the variance of the generator loss, yielding:

$$\bar{L}_G(\theta_D) \le F_D\left(\left(1+V_G/2\right)e^{-\bar{L}(\theta_G)} + V_G/2e^{\varepsilon}\right) \tag{7}$$

Lemma 2 shows that the discriminator loss given a generator is inversely correlated with the generator loss. This means strong generators may create significantly higher discriminator loss. If such a high discriminator loss cannot be sufficiently reduced through the optimization process, which is likely since the training budget is always limited, the ideal objective cannot be sufficiently optimized as well.

To further illustrate the effects of both the generator and discriminator optimizations, consider a simplified modeling of the optimization process, which is based on trajectory analysis of gradient descent for deep linear neural networks.

Proposition 1 (Gradient descent trajectory of deep linear neural networks (informal)). In gradient descent, let θ(t) be the model parameters after t updates, n be the learning rate that meets certain regularities, and N be the number of layers in the model, yielding:

$$\mathcal{L}(\theta(t)) \leq \mathcal{L}(\theta(0)) \cdot \left(1 - \eta \cdot c^{\frac{2(N-1)}{N}}\right)^{t} \tag{8}$$

where c is a positive constant.

Together with Lemmas 1 and 2, the following is true. Theorem 1 (Optimization of the ideal discriminator objective). Consider the discriminator optimization after the generator is trained with several updates. Let $\eta_G$ be the generator's learning rate and $N_G$ be the generator depth. The generator loss after $t_G$ updates is:

$$L(\theta_G(t_G)) = L(\theta_G(0))(1 - \eta_G \cdot \xi_G)^{t_G} \tag{9}$$

where $\xi_G = c^{2(N_G-1)/N_G}$. Subsequently, let np be the discriminator's learning rate and $N_D$ be the discriminator depth. Then after tp discriminator updates:

$$L^*(\theta_D(t_D)) \leq F\left(e^{-L(\theta_G(t_G))}\right) \cdot (1 - \eta_D \cdot \xi_D)^{t_D} + 2^{-1/2} m_D [L(\theta_G(t_G))]^{1/2}, \tag{10}$$

Note some constants in Equation (7) are neglected for simplicity.

Figure 15:
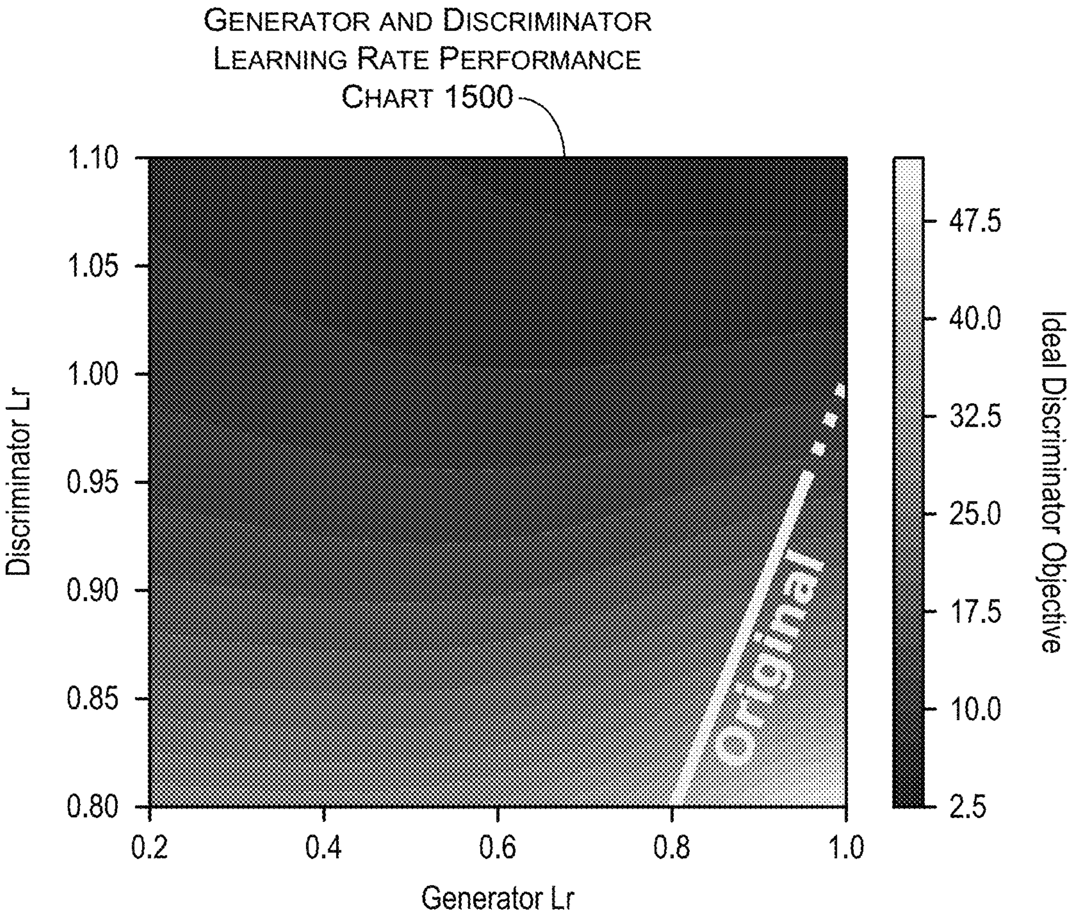

Thus, in terms of generator optimization, increasing the generator learning rate first helps and then hurts the discriminator performance for a given discriminator setting, as also illustrated in FIG. 15 via generator and discriminator learning rate performance chart 1500. This results in a range where the generator learning rate is the best for the discriminator performance. Similarly, since ξ∝N, increasing the generator depth would also first help and then hurt the discriminator performance.

In terms of discriminator optimization, increasing the discriminator learning rate or depth can almost always help the discriminator performance. In an ideal case, if the discriminator optimization is sufficient, for example, by letting $\eta_D \cdot \xi_D \approx 1$ or $t_D \approx \infty$ in Equation (10), then the discriminator performance will improve monotonically with the generator performance, as also illustrated in FIG. 15 where the discriminator learning rate is sufficiently large. Unfortunately, it is not possible to always sufficiently optimize the discriminator in practice given training instability or/and limited training budgets.

Interestingly, Equation (10) shows that, with increasingly sufficient discriminator optimization, the best generator should shift to one with a larger capacity, as also illustrated in FIG. 15. This echoes the empirical observation in FIG. 14.

Finally, Equation (10) also reflects the limitation of the original ELECTRA design mentioned in Section 3.2. As also illustrated in FIG. 15, since the generator and discriminator are assigned almost the same learning rate, the original design can only reach a line (1-D subspace) in the entire optimization space. Further, due to the training instability of the generator, this line is truncated where the discriminator learning rate is still small and thus the discriminator performance is still suboptimal. In contrast, DecoupledOptim can increase the discriminator learning rate without being affected by the generator learning, thus achieving better performance by exploring the entire optimization space.

Experiments

Experiments were conducted with two standard settings, Base and Large, following BERT as well as Meng, et al., (2021), *Coco-Im: Correcting and contrasting text sequences for language model pretraining*, Advances in Neural Information Processing Systems, 34, 23102-23114 and Bajaj, et al., (2022), *Metro: Efficient denoising pretraining of large scale autoencoding language models with model generated signals*, arXiv preprint arXiv:2204.06644. Specifically, Wikipedia and BookCorpus, Zhu, et al., (2015), *Aligning books and movies: Towards story-like visual explanations by watching movies and reading books*, In Proceedings of the IEEE international conference on computer vision (pp. 19-27), (16 GB of texts, 256M samples) were employed for pretraining with sequence length as 512. A cased sentence piece BPE vocabulary of 128K tokens was used, since larger vocabulary size improves LLMs without significant additional training and inference cost.

Pretraining was conducted for 125K updates with a batch size of 2048. For DecoupledOptim, the same hyperparameter combination was employed in both Base and Large settings, namely the generator learning rate is set as $2\times10^{-4}$ and the discriminator learning rate is set as $1.5\times10^{-3}$. The main model (discriminator) in the Base setting follows the $\text{BERT}_{base}$ architecture, namely a 12 layer transformer with 768 hidden dimensions plus T5 relative position encoding with 32 bins. Admin (adaptive model initialization) was employed for model initialization to stabilize the training. Liu, et al., (2020), *Understanding the difficulty of training transformers*, arXiv preprint arXiv:2004.08249 and Liu, et al., (2021), *Multi-head or single-head? an empirical comparison for transformer training*, arXiv preprint arXiv: 2106.09650. The main model in the Large setting follows $\text{BERT}_{Large}$, namely a 24-layer transformer with 1024 hidden dimensions and 128 relative position encoding bins. The auxiliary model (generator) in Base has the same architecture as the main model.

Evaluation on downstream tasks was conducted following the setup in Meng, et al., (2021), *Coco-Im: Correcting and contrasting text sequences for language model pretraining*, Advances in Neural Information Processing Systems, 34, 23102-23114; and Bajaj, et al., (2022), *Metro: Efficient denoising pretraining of large scale autoencoding language models with model generated signals*, arXiv preprint arXiv: 2204.06644. Specifically, tuned models were evaluated on GLUE, Wang, et al., (2018), *GLUE: A multi-task benchmark and analysis platform for natural language understanding*, arXiv preprint arXiv:1804.07461, language understanding benchmark with a single-task, single-model fine-tuning setting following previous works. Training hyperparameters such as the AdaMax optimizer were employed, Kingma, et al., (2014), *Adam: A method for stochastic optimization*, arXiv preprint arXiv:1412.6980, from Liu, et al., (2019), *Multi-task deep neural networks for natural language understanding*, arXiv preprint arXiv:1901.11504 and Liu, et al., (2020), *The microsoft toolkit of multi-task deep neural networks for natural language understanding*, arXiv preprint arXiv:2002.07972.

The following reports Spearman correlation on STS-B, Matthews correlation on CoLA, and accuracy on the rest of the datasets:

TABLE 1

| Model | MNLI-(m/mm) (Acc.) | QQP (Acc.) | QNLI (Acc.) | SST-2 (Acc.) | CoLA (Mat. Corr.) |
|---|---|---|---|---|---|
| Base Setting | | | | | |
| BERT [Devlin et al. (2019)] | 84.5/— | 91.3 | 91.7 | 93.2 | 58.9 |
| RoBERTa [Liu et al. (2019)] | 85.8/85.5 | 91.3 | 92.0 | 93.7 | 60.1 |
| XLNet [Yang et al. (2019)] | 85.8/85.4 | — | — | 92.7 | — |
| DeBERTa [He et al. (2020)] | 86.3/86.2 | — | — | — | — |
| TUPE [Ke et al. (2020)] | 86.2/86.2 | 91.3 | 92.2 | 93.3 | 63.6 |
| ELECTRA [Clark et al. (2020)] | 86.9/86.7 | 91.9 | 92.6 | 93.6 | 66.2 |
| MC-BERT [Xu et al. (2020)] | 85.7/85.2 | 89.7 | 91.3 | 92.3 | 62.1 |
| COCO-LM [Meng et al. (2021)] | 88.5/88.3 | 92.0 | 93.1 | 93.2 | 63.9 |
| AMOS [Meng et al. (2022)] | 88.9/88.7 | 92.3 | 93.6 | 94.2 | 70.7 |
| DeBERTaV3 [He et al. (2021)] | 89.3/89.0 | — | — | — | — |
| METRO [Bajaj et al. (2022)] | 89.0/88.8 | 92.2 | 93.4 | 95.0 | 70.6 |
| METRO $_{ReImp}$ | 89.0/88.9 | 92.0 | 93.4 | 94.4 | 70.1 |
| DecoupledOptim | 89.4/89.7 | 92.4 | 93.6 | 94.7 | 70.6 |
| Large Setting | | | | | |
| METRO $_{ReImp}$ | 89.9/90.2 | 92.5 | 94.5 | 94.3 | 69.7 |
| DecoupledOptim | 90.5/90.6 | 92.4 | 94.7 | 96.1 | 72.1 |

| Model | RTE (Acc.) | MRPC (Acc.) | STS-B (Spear. Corr.) | AVG |
|---|---|---|---|---|
| Base Setting | | | | |
| BERT [Devlin et al. (2019)] | 68.6 | 87.3 | 89.5 | 83.1 |
| RoBERTa [Liu et al. (2019)] | 68.2 | 87.3 | 88.5 | 83.3 |
| XLNet [Yang et al. (2019)] | — | — | — | — |
| DeBERTa [He et al. (2020)] | — | — | — | — |
| TUPE [Ke et al. (2020)] | 73.6 | 89.9 | 89.2 | 84.9 |
| ELECTRA [Clark et al. (2020)] | 75.1 | 88.2 | 89.7 | 85.5 |
| MC-BERT [Xu et al. (2020)] | 75.0 | 86.0 | 88.0 | 83.7 |
| COCO-LM [Meng et al. (2021)] | 84.8 | 91.4 | 90.3 | 87.2 |
| AMOS [Meng et al. (2022)] | 86.6 | 90.9 | 91.6 | 88.6 |
| DeBERTaV3 [He et al. (2021)] | — | — | — | — |
| METRO [Bajaj et al. (2022)] | 86.5 | 91.2 | 91.2 | 88.6 |
| METRO $_{ReImp}$ | 86.3 | 91.4 | 91.2 | 88.5 |
| DecoupledOptim | 88.8 | 92.2 | 91.1 | 89.1 |
| Large Setting | | | | |
| METRO $_{ReImp}$ | 88.8 | 91.9 | 91.6 | 89.2 |
| DecoupledOptim | 88.4 | 91.2 | 92.2 | 89.7 |

lists the downstream evaluation results of DecoupledOptim and competitive baselines under the Base and Large setting. DecoupledOptim outperforms previous state-of-the-arts by notable margins in terms of both the overall GLUE score and specific results on large datasets, which are considered to be more reliable.

Figure 16:
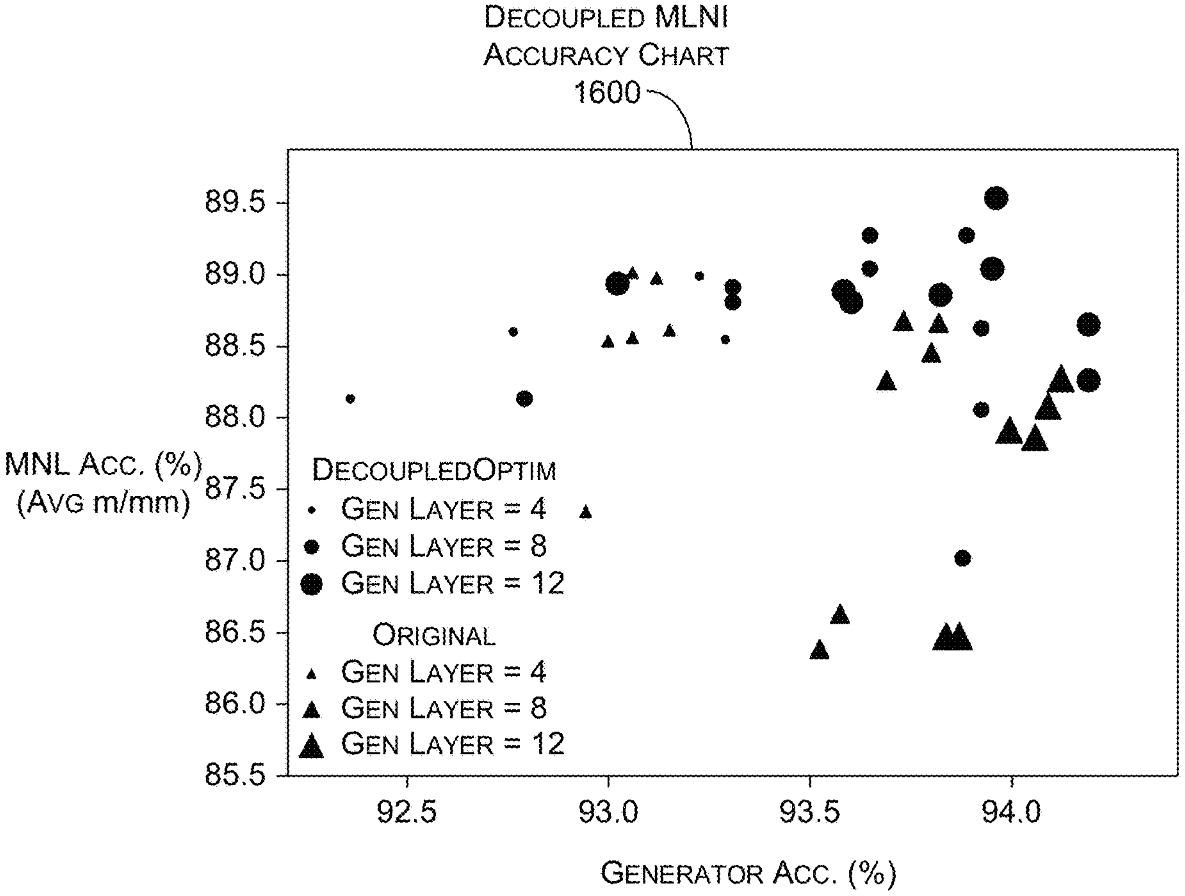

Experiments were conducted with a wide variety of pretraining hyperparameters in the Base setting to validate the robustness of DecoupledOptim with respect to the change of generator capacity. As shown in FIG. 16 via decoupled MLNI accuracy chart 1600, DecoupledOptim yields more stable downstream performance when the generator capacity varies/the hyperparameter changes. DecoupledOptim also achieves consistently better performance when employing a generator with larger size.

In each pretraining step, DecoupledOptim introduces no additional model parameters or computation cost compared to the original ELECTRA design. Note that separate generator and discriminator embeddings in DecoupledOptim involve the same amount of operations as the shared embeddings in the original ELECTRA design, since the gradients of the embeddings have to be back-propagated from the generator and discriminator loss separately in both scenarios As noted above, using a large auxiliary generator often results in a degradation of downstream performance of the main discriminator model. Such performance degeneration is due to inadequate control of the generator capacity during pretraining, highlighting a long-overlooked issue in ELECTRA-style training. The results above show that decoupled optimization greatly improves the training robustness and downstream performance.

Additional Details

As noted, the machine learning models employed for decoupled optimization can be neural networks. In a natural language processing scenario, one or more mapping layers can perform certain encoding functionality. For example, the one or more mapping layers can include a lexicon encoder that maps a sequence of tokens into a sequence of input embedding vectors. The one or more mapping layers can also include a transformer encoder that maps the input embedding vectors into a sequence of contextual embedding vectors.

Generally, the techniques described above can be employed to pretrain an auxiliary (e.g., discriminator) model that can be subsequently tuned to perform one or more tasks. In natural language processing scenarios, such a tuned model can be employed in a search engine, e.g., to match queries to documents or to determine the sentiment of a given query. As another example, a tuned model can be used in a digital assistant or bot to rank candidate responses to user utterances. In an image processing context, a tuned model could have task-specific layers to indicate whether certain classifications of objects are present in a given image, semantically label images, etc., as well as one or more shared convolutional layers. Note that the one or more task-specific layers can subsequently be grafted onto the encoder of the discriminator for subsequent tuning.

Technical Effect

As discussed above, pretraining of a machine learning model can involve the use of an auxiliary model with a main model. However, conventional approaches for doing so tend to (1) share parameters between the main model and the auxiliary model during pretraining, and (2) jointly optimize the auxiliary and main models together. As a consequence, it is difficult to control the capacity of the auxiliary model during pretraining. Further, as noted above, auxiliary models with very large capacities can tend to hurt the performance of the main model.

By separately optimizing the auxiliary and main models during pretraining, the disclosed techniques allow for accelerated optimization of the main model. By increasing the learning rate of the main model, the main model can learn pretrained parameters that allow for accurate tuning at a later time. As a consequence, the resulting final tuned model can exhibit higher accuracy than would be the case had joint optimization techniques been employed.

Further, since the main model can employ a higher learning rate, fewer pretraining examples may be employed to pretrain the model. As a consequence, processing and/or memory resources can be preserved that would have otherwise been employed for pretraining using more examples. In addition, the pretrained parameters may allow for tuning to converge more quickly and thus achieve satisfactory accuracy using relatively fewer labeled training examples during tuning. Thus, processing and/or memory resources can also be preserved during tuning.

Device Implementations

As noted above with respect to FIG. 6, system 600 includes several devices, including a client device 610, a server 620, a server 630, and a client device 640. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute data in the form of computer-readable instructions to provide functionality. Computer-readable instructions and/or data can be stored on storage, such as storage/memory and or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 650. Without limitation, network(s) 650 can include one or more local area networks (LANs), wide area networks (WANs), the Internet, and the like.

Additional Examples

Various examples are described above. Additional examples are described below. One example includes a method performed on a computing device, the method comprising obtaining first sequences of first values, masking one or more of the first values in the first sequences to obtain masked first sequences having one or more of the first values and one or more masked values, using a first machine learning model, determining first predictions of the one or more masked values in the masked first sequences, replacing the one or more masked values with the first predictions to obtain second sequences of second values, using a second machine learning model, determining second predictions of whether the second values were present in the first sequences or replaced by different values predicted by the first machine learning model, and performing separate optimization of the first machine learning model and the second machine learning model, the first machine learning model being optimized based at least on the first predictions and the second machine learning model being optimized based at least on the second predictions.

Another example can include any of the above and/or below examples where the first predictions represent probability distributions over predicted values for the masked values.

Another example can include any of the above and/or below examples where the replacing comprises sampling from the probability distributions.

Another example can include any of the above and/or below examples where the first sequences of first values comprise tokens obtained from text.

Another example can include any of the above and/or below examples where the first machine learning model is a text generator and the second machine learning model is a discriminator.

Another example can include any of the above and/or below examples where the first machine learning model and the second machine learning model represent the tokens using embeddings.

Another example can include any of the above and/or below examples where the first machine learning model comprises a first encoder, the second machine learning model comprises a second encoder, and the first encoder does not share embeddings with the second encoder.

Another example can include any of the above and/or below examples where the first sequences of first values comprise unlabeled pretraining data, the separate optimization is performed during pretraining, and the separate optimization involves a first adaptive optimization of first parameters of the first machine learning model and a second adaptive optimization of second parameters of the second machine learning model.

Another example can include any of the above and/or below examples where the first adaptive optimization and the second adaptive optimization are performed using an Adam optimizer.

Another example can include any of the above and/or below examples where the method further comprises, after optimization of the second machine learning model resulting in a pretrained second machine learning model, tuning the pretrained second machine learning model for a particular task.

Another example can include any of the above and/or below examples where the tuning is based on labeled training data for the particular task.

Another example can include any of the above and/or below examples where the particular task comprises one or more of predicting textual entailment, predicting answers to questions, predicting paraphrase relationships, predicting grammatical acceptability, predicting sentiment, or predicting sentence similarity.

Another example includes a system comprising a hardware processing unit and a storage resource storing computer-readable instructions which, when executed by the hardware processing unit, cause the hardware processing unit to obtain a pretrained machine learning model having been pretrained to predict whether second values in second sequences were present in first sequences of first values or replaced by different values predicted by another machine learning model, the pretrained machine learning model and the another machine learning model having been separately optimized and tune the pretrained machine learning model for a particular task using task-specific training data to obtain a tuned machine learning model.

Another example can include any of the above and/or below examples where the pretrained machine learning model is pretrained using unlabeled pretraining data.

Another example can include any of the above and/or below examples where the task-specific training data includes labeled training data.

Another example can include any of the above and/or below examples where the labeled training data includes labeled examples of text.

Another example can include any of the above and/or below examples where the pretrained machine learning model represents tokens with embeddings that are not shared with the another machine learning model.

Another example can include any of the above and/or below examples where the computer-readable instructions, when executed by the hardware processing unit, cause the hardware processing unit to receive input data and process the input data using the tuned machine learning model.

Another example can include any of the above and/or below examples where the input data comprises a query, the processing comprises predicting an intent of the query using the tuned machine learning model, determining query results based at least on the predicted intent, and replying to the query with the query results.

Another example can include any of the above and/or below examples where a computer-readable storage medium storing computer-readable instructions which, when executed by a processing unit, cause the processing unit to perform acts comprising obtaining first sequences of first values, masking one or more of the first values in the first sequences to obtain masked first sequences having one or more of the first values and one or more masked values, using a first machine learning model, determining first predictions of the one or more masked values in the masked first sequences, replacing the one or more masked values with the first predictions to obtain second sequences of second values, using a second machine learning model, determining second predictions of whether the second values were present in the first sequences or replaced by different values predicted by the first machine learning model, and performing separate optimization of the first machine learning model and the second machine learning model, the first machine learning model being optimized based at least on the first predictions and the second machine learning model being optimized based at least on the second predictions.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method performed on a computing device, the method comprising:

obtaining first sequences of first values;

masking one or more of the first values in the first sequences to obtain masked first sequences having one or more of the first values and one or more masked values;

using a first machine learning model, determining first predictions of the one or more masked values in the masked first sequences;

replacing the one or more masked values with the first predictions to obtain second sequences of second values;

using a second machine learning model, determining second predictions of whether the second values were present in the first sequences or replaced by different values predicted by the first machine learning model; and performing separate optimization of the first machine learning model and the second machine learning model, the first machine learning model being optimized based at least on the first predictions and the second machine learning model being optimized based at least on the second predictions.

2. The method of claim 1, wherein the first predictions represent probability distributions over predicted values for the masked values.

3. The method of claim 2, wherein the replacing comprises sampling from the probability distributions.

4. The method of claim 3, wherein the first sequences of first values comprise tokens obtained from text.

5. The method of claim 4, wherein the first machine learning model is a text generator and the second machine learning model is a discriminator.

6. The method of claim 5, wherein the first machine learning model and the second machine learning model represent the tokens using embeddings.

7. The method of claim 6, wherein the first machine learning model comprises a first encoder, the second machine learning model comprises a second encoder, and the first encoder does not share embeddings with the second encoder.

8. The method of claim 7, wherein the first sequences of first values comprise unlabeled pretraining data, the separate optimization is performed during pretraining, and the separate optimization involves a first adaptive optimization of first parameters of the first machine learning model and a second adaptive optimization of second parameters of the second machine learning model.

9. The method of claim 8, wherein the first adaptive optimization and the second adaptive optimization are performed using an Adam optimizer.

10. The method of claim 8, further comprising:

after optimization of the second machine learning model resulting in a pretrained second machine learning model, tuning the pretrained second machine learning model for a particular task.

11. The method of claim 10, wherein the tuning is based on labeled training data for the particular task.

12. The method of claim 11, the particular task comprising one or more of predicting textual entailment, predicting answers to questions, predicting paraphrase relationships, predicting grammatical acceptability, predicting sentiment, or predicting sentence similarity.

13. A system comprising:

a hardware processing unit; and a storage resource storing computer-readable instructions which, when executed by the hardware processing unit, cause the hardware processing unit to:

obtain a pretrained machine learning model having been pretrained to predict whether second values in second sequences were present in first sequences of first values or replaced by different values predicted by another machine learning model, the pretrained machine learning model and the another machine learning model having been separately optimized; and tune the pretrained machine learning model for a particular task using task-specific training data to obtain a tuned machine learning model.

14. The system of claim 13, wherein the pretrained machine learning model is pretrained using unlabeled pretraining data.

15. The system of claim 14, wherein the task-specific training data includes labeled training data.

16. The system of claim 15, wherein the labeled training data includes labeled examples of text.

17. The system of claim 16, wherein the pretrained machine learning model represents tokens with embeddings that are not shared with the another machine learning model.

18. The system of claim 16, wherein the computer-readable instructions, when executed by the hardware processing unit, cause the hardware processing unit to:

receive input data; and process the input data using the tuned machine learning model.

19. The system of claim 18, the input data comprising a query, the processing comprising:

predicting an intent of the query using the tuned machine learning model;

determining query results based at least on the predicted intent; and replying to the query with the query results.

20. A computer-readable storage medium device storing computer-readable instructions which, when executed by a processing unit, cause the processing unit to perform acts comprising:

obtaining first sequences of first values;

masking one or more of the first values in the first sequences to obtain masked first sequences having one or more of the first values and one or more masked values;

using a first machine learning model, determining first predictions of the one or more masked values in the masked first sequences;

replacing the one or more masked values with the first predictions to obtain second sequences of second values;

using a second machine learning model, determining second predictions of whether the second values were present in the first sequences or replaced by different values predicted by the first machine learning model; and performing separate optimization of the first machine learning model and the second machine learning model, the first machine learning model being optimized based at least on the first predictions and the second machine learning model being optimized based at least on the second predictions.

* * * * *